United States Patent [19]
Levine

[11] 3,860,803
[45] Jan. 14, 1975

[54] AUTOMATIC METHOD AND APPARATUS FOR FABRICATING PROGRESSIVE DIES

[75] Inventor: Richard Carl Levine, Plainfield, N.J.

[73] Assignee: Diecomp, Inc., Plainfield, N.J.

[22] Filed: Aug. 24, 1970

[21] Appl. No.: 66,533

[52] U.S. Cl.................. 235/151.1, 29/208 C, 76/4, 76/107 R
[51] Int. Cl........................... B21k 5/20, G06g 7/48
[58] Field of Search............ 235/151, 151.1, 151.11, 235/150, 150.1; 318/567, 568, 569, 575–578; 72/8, 9, 362; 90/13.99; 76/4, 107, 208 C; 29/527.6, 529; 444/1

[56] References Cited
UNITED STATES PATENTS

| | | | |
|---|---|---|---|
| 2,992,375 | 7/1961 | Mustonen et al.................. | 318/675 |
| 3,145,474 | 8/1964 | Taylor, Jr. ......................... | 525/151 |
| 3,302,209 | 1/1967 | Fengler....................... | 90/13.99 UX |
| 3,318,195 | 5/1967 | Fitzner....................... | 90/13.99 UX |
| 3,391,392 | 7/1968 | Doyle......................... | 90/13.99 UX |
| 3,461,749 | 8/1969 | Gagne................................ | 76/107 |
| 3,512,431 | 5/1970 | Caja................................. | 76/107 R |
| 3,596,068 | 7/1971 | Doyle................................. | 235/150 |
| 3,605,528 | 9/1971 | Whitacre et al. ................. | 76/107 R |

Primary Examiner—Joseph F. Ruggiero
Attorney, Agent, or Firm—J. T. Martin; Gerald J. Ferguson, Jr.; Joseph J. Baker

[57] ABSTRACT

A progressive die for fabricating a piecepart is automatically described and/or fabricated in response to input signals representing co-ordinate dimensions on a drawing of the piecepart. The co-ordinate signals, including outlines, holes, bends, etc., are recorded and transformed to represent a flat sheet, with compensation being provided for all material deformation properties. The flat piecepart signals are then rotated to locate optimum piecepart orientation on a ribbon layout for minimizing scrap. The flat signals are then transformed once again to determine if any portions of the piecepart outline must be separately punched. The various input signals and transformed signals are then sorted in proper order of individual die operations, resulting in an array of signals which fully describe the operations to be carried out by the die. These signals may then be converted, as desired, to provide die drawings, punched tape for use with numerically controlled machine for manufacturing the progressive die, or other suitable output format.

41 Claims, 56 Drawing Figures

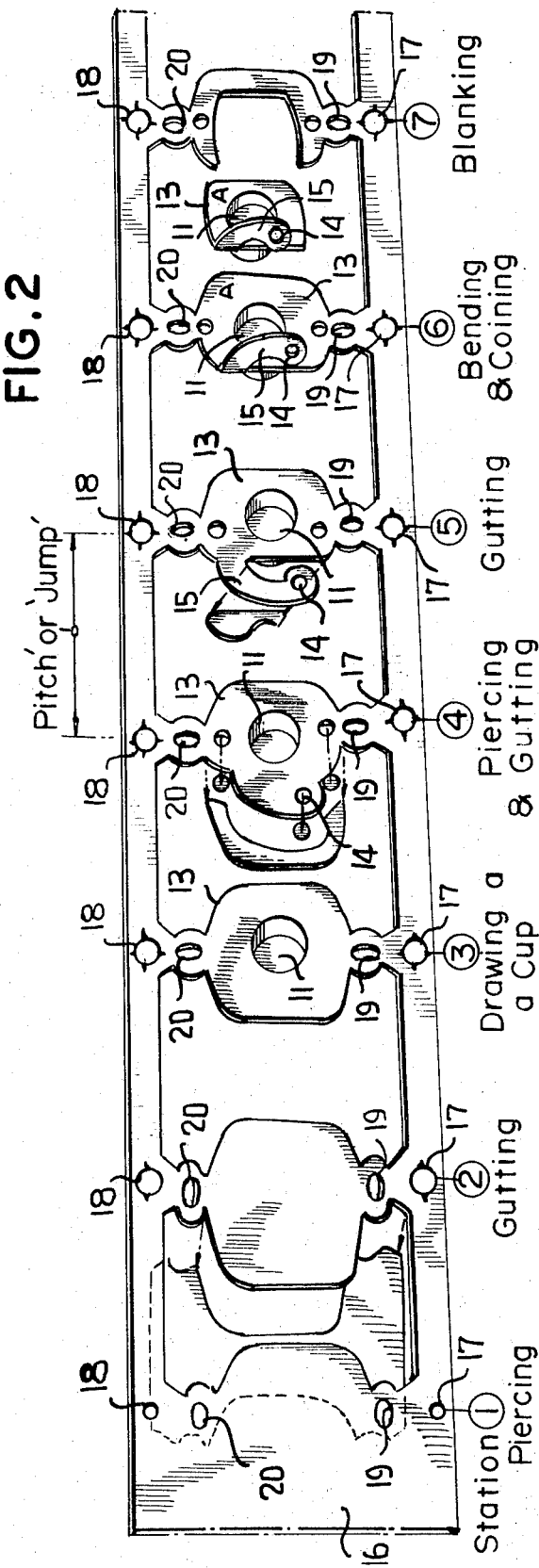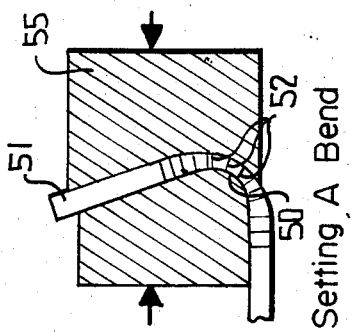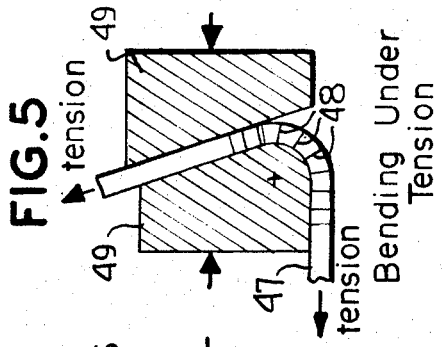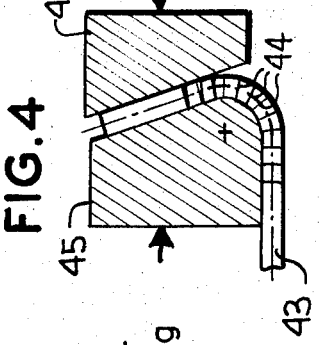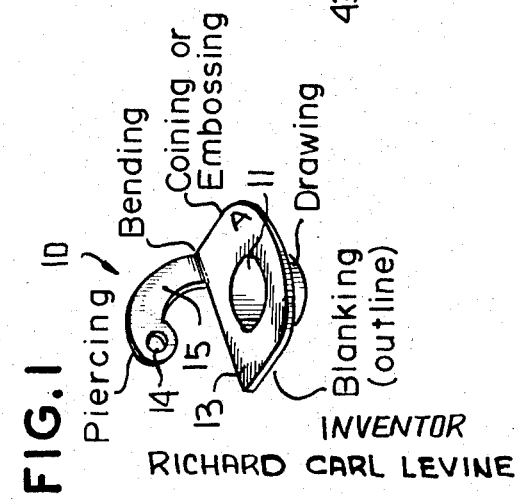

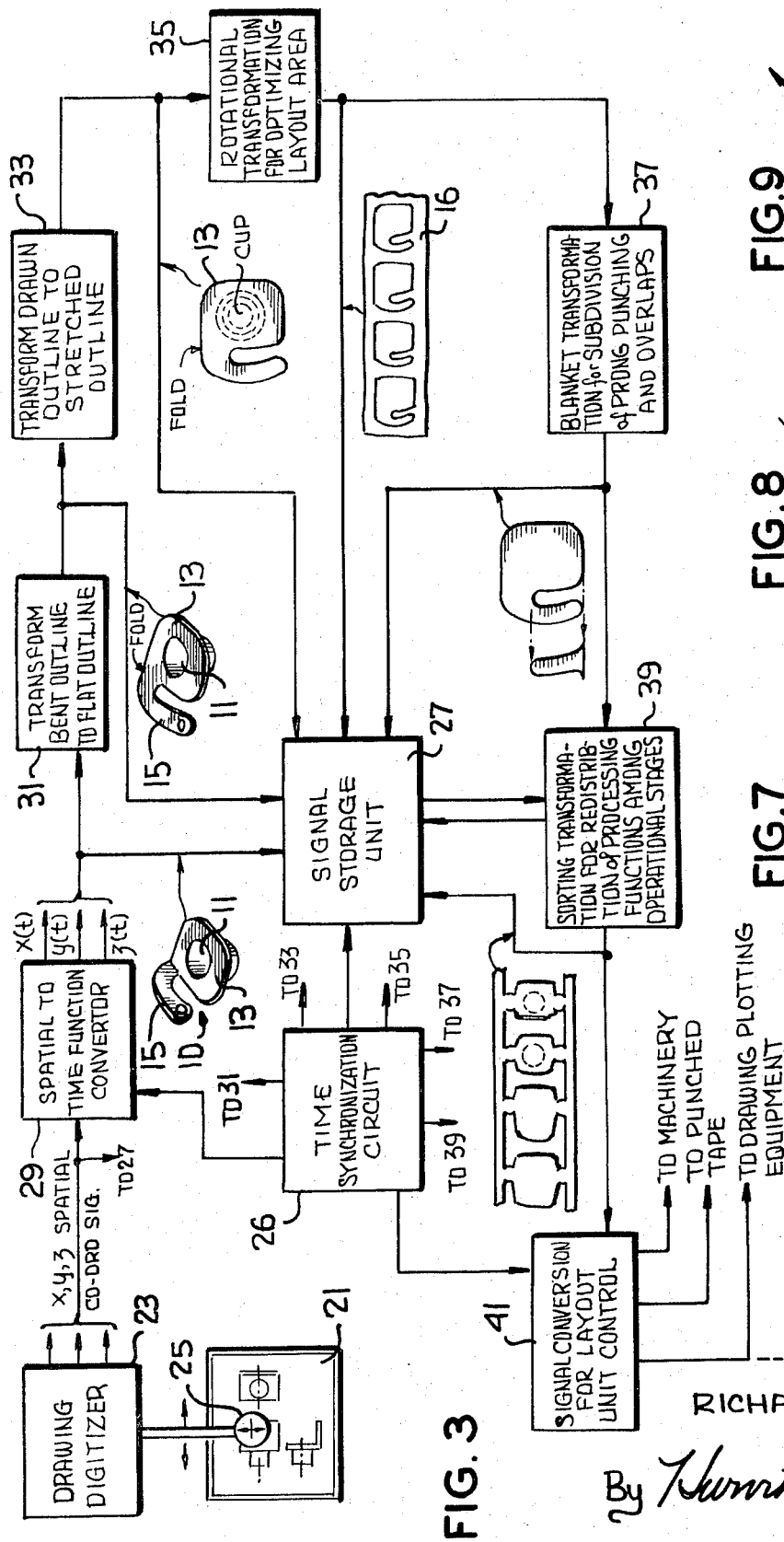
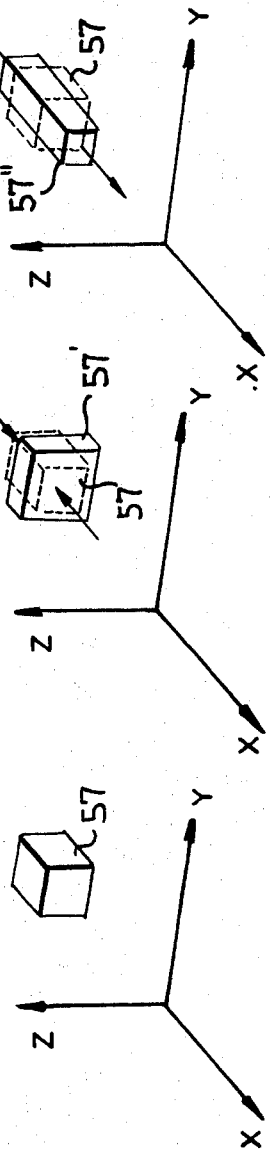

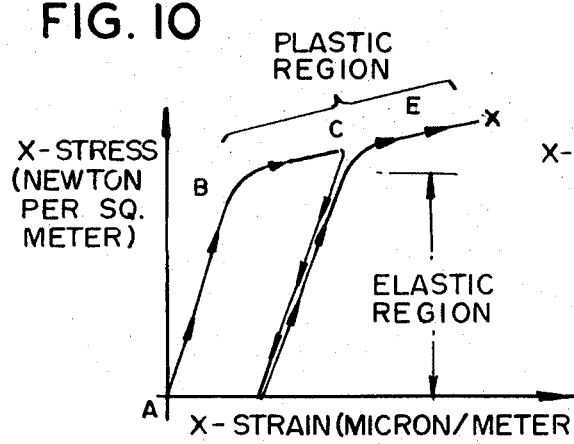
FIG. 10
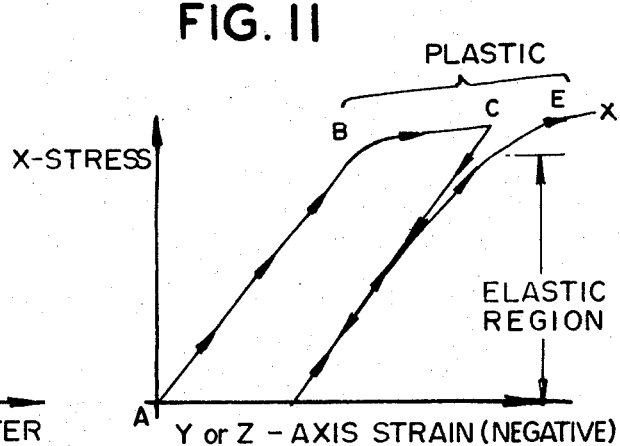
FIG. 11
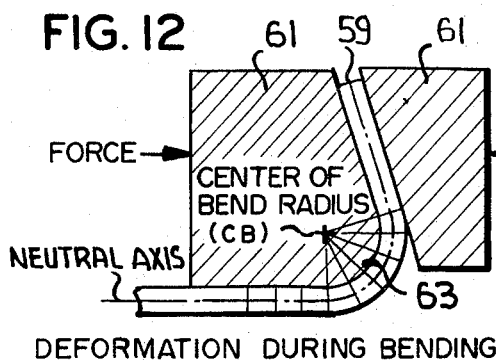
FIG. 12 — DEFORMATION DURING BENDING
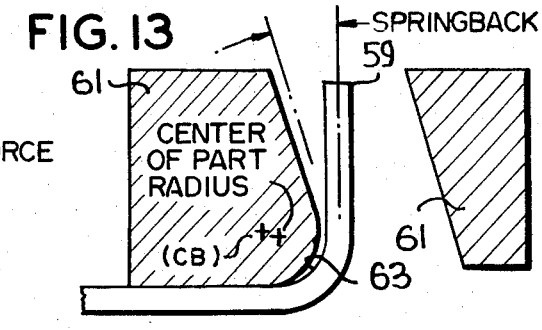
FIG. 13 — DEFORMATION AFTER BENDING
FIG. 14
INVENTOR
RICHARD CARL LEVINE
By Kurntz & Rose
ATTORNEYS

INVENTOR
RICHARD CARL LEVINE

ATTORNEYS

INVENTOR
RICHARD CARL LEVINE

ATTORNEYS

INVENTOR
RICHARD CARL LEVINE

By Hurvitz & Rose
ATTORNEYS

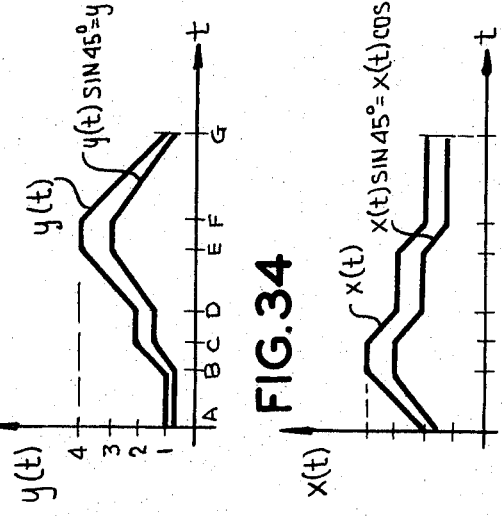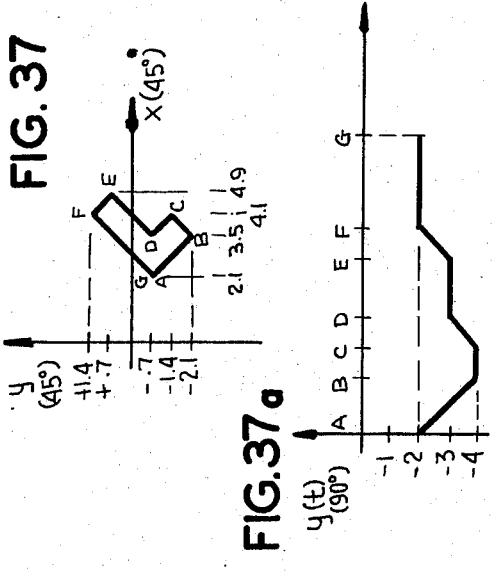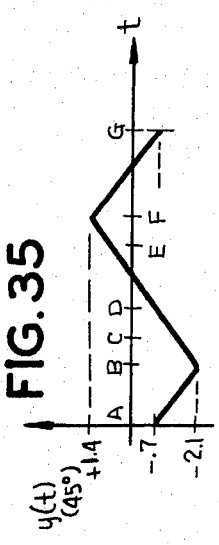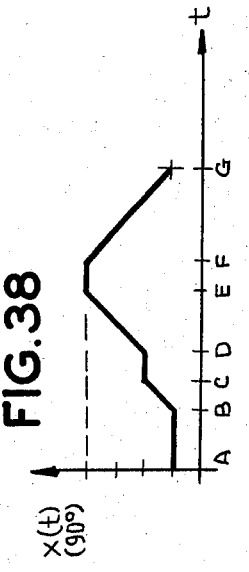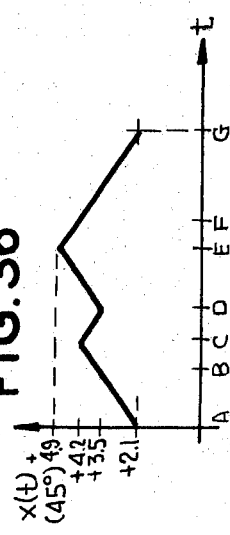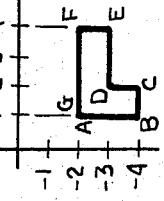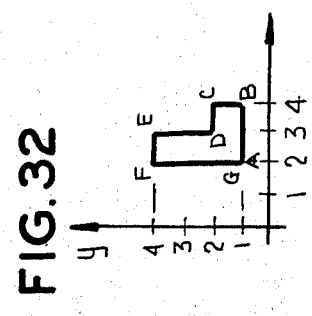

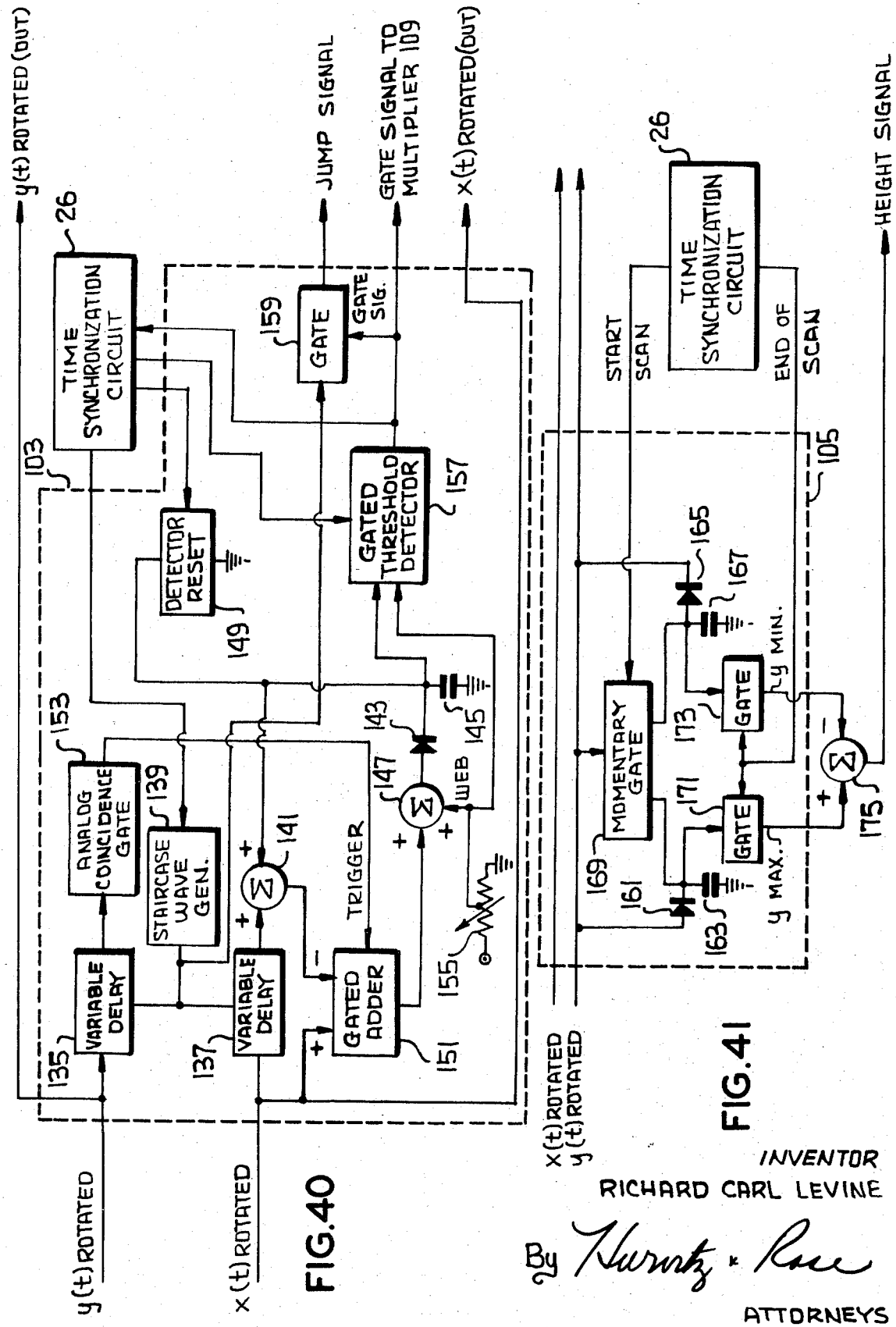

INVENTOR
RICHARD CARL LEVINE

By Hurwitz & Rose
ATTORNEYS

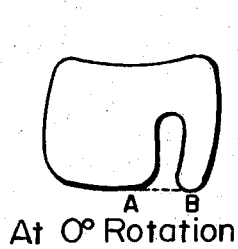
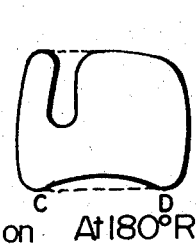
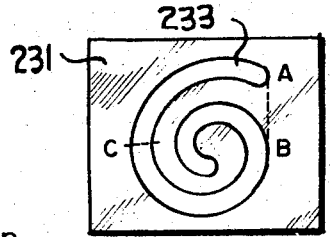
FIG. 44 — At 0° Rotation
FIG. 45 — At 90° Rotation
FIG. 46 — At 180° Rotation
FIG. 54
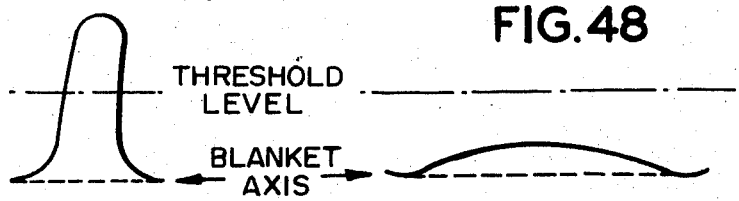
FIG. 47
FIG. 48
FIG. 55
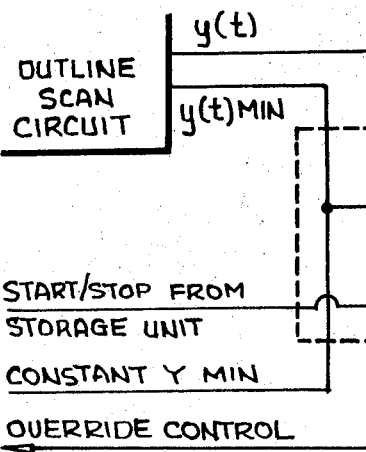
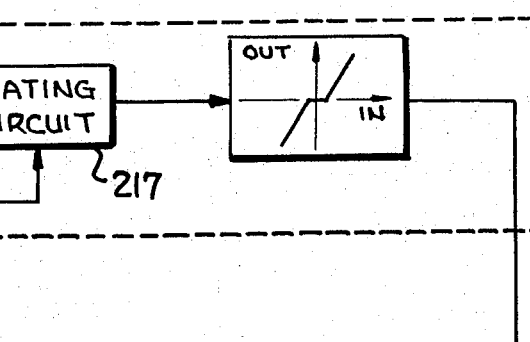
FIG. 49
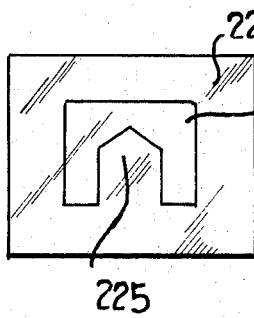
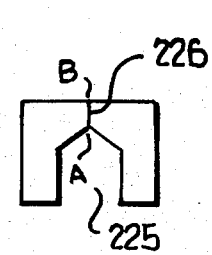
FIG. 50  FIG. 51  FIG. 52  FIG. 53
INVENTOR
RICHARD CARL LEVINE

AUTOMATIC METHOD AND APPARATUS FOR FABRICATING PROGRESSIVE DIES

BACKGROUND OF THE INVENTION

The present invention relates generally to die making and particularly to a method and apparatus for fabricating a progressive die to be utilized in manufacturing a piecepart. It is to be understood that whereas the preferred embodiment described herein takes the form of special purpose processing equipment, the method of the present invention may be readily practiced on a suitably programmed general purpose computer The diemaking industry, since its inception, has been characterized by the application of empirical knowledge of highly experienced workers to die design. These workers usually more than compensate for a lack of scientific training by liberal utilization of time, effort and ingenuity in designing workable dies. More specifically, conventional die design is usually conducted in the following manner. A die user provides a mechanical drawing or prototype model of some piecepart which is to be mass-produced. The die designer examines the piecepart drawings and designs a die on paper. In doing this, he utilizes many years of experience with similar part construction and his empirical knowledge (for example, of how much to overbend or set a curl or fold in sheet metal during a bending operation so that it will spring-back to the desired angle). Such information is, however, not derived from first principles but is extrapolated from prior similar cases in the designer's experience. Thus, many times the die does not work precisely as intended when constructed from the first drawings; often portions of the die must be removed, the tempered metal may have to be annealed, portions must be ground or machined to new dimensions or angles, or the die may have to be totally redesigned and reassembled and tested again. Often the source of the problem is no more than a slight arithmetic error on the part of the designer, causing a punch to be out of line with a corresponding hole in a die, and resulting in damage to the die. More often the problems are inaccuracies in the "rules of thumb" used by the designer in approximating certain bending, drawing, or blanking dimensions. The most insidious form of such inaccuracies are those which are small enough to escape detection during initial short run tests but which cause premature breakage of the die or the sheet metal stock in the midst of a long production stamping run; this leads to long and costly delays for repairs and causes idle production time.

In die manufacturing, as in all manufacturing industries, there is a constant pressure for greater speed and accuracy in part design. The utilization of punched tape-operated machine tools (numerical control machines) provides great savings in machining time and improved accuracy. Heretofore, these machines have not been practical for tool or die for two reasons. First, the machining of a die is usually a one-time operation; consequently, costs cannot be amortized over a large production run. Second, although many computer systems are available to aid a designer in translating his design drawings into program tapes, the design of these programs represents additional steps that the designer must take following his usual design time. Thus, when only a single die is to be made, existing numerical control methods are only economically feasible when the extra time spent by the designer in program tape preparation is not more costly than the time saved in the shop.

These factors emphasize the deeply felt need in the die making industry for the development of a mechanism for automatically and precisely designing and laying out a die. Such mechanism should be capable of directly controlling numerical control machines, where available, or providing design drawings of the die.

It is therefore an object of the present invention to provide a method for the designing dies with automatic equipment.

It is another object of the present invention to provide a method and apparatus for automatically designing a die for use in manufacturing a specified piecepart, wherein the input information comprises a drawing or co-ordinate signals representing the piecepart.

It is another object of the present invention for providing a method and apparatus for transforming co-ordinate signals representing a piecepart into signals which can alternatively be employed to control a machine to fabricate a die or to provide a design drawing of the die.

SUMMARY OF THE INVENTION

In essence, the method of the present invention comprises the following automatic steps:

1. Recording the co-ordinate dimensions of the desired piece-part from a piecepart drawing, with identification of all bends, holes, drawn cups, etc.;
2. "Inverse development" of the piecepart co-ordinates back into a flat sheet, with material deformation properties taken into account by the mechanism:
3. Optimum piecepart layout on sheet metal stock to minimize scrap;
4. Determination of number of punching or blanking steps required with view to die and piecepart reliability;
5. Sorting various signals developed during above steps to optimize the order of steps to be performed by progressive die;
6. Layout drawing production keyed by the actions taken during steps 2 through 5; co-ordination of deformation planes, lines and surfaces are numerically located at this point and stored electrically.
7. Standardized punch and cam sections taken from electrically stored list are keyed to co-ordinates of corresponding holes, cups, and bends co-ordinates; pieces of the die are produced by the action of numerical control machines which utilize the co-ordinates of the holes, edges, corners and surfaces taken from the numerically located desired points formed in step 6;
8. Auxiliary parts lists, drawings and assembly instruction views are printed as additional guidance for the user.

The final result of the method of the present invention is the cutting of metal stock into the portions of the die so that they can be assembled into the final die. This can be effected by direct electrical connection of control signals from disclosed apparatus to a suitably equipped milling machine or grinder having electrical control apparatus; however, for cost reasons, it is preferable to take the equivalent course of action of preparing a so-called "Numerical Control Tape" which permits operation of the machine tool at a later time. In addition, another equivalent course of action is to prepare drawings of the individual portions of the die and a layout drawing so that the final steps of the die construction can be carried out by a mechanic.

BRIEF DESCRIPTION OF DRAWINGS

The above and still further objects, features and advantages of the present invention will become apparent upon consideration of the following detailed description of one specific embodiment thereof, especially when taken in conjunction with the accompanying drawings, wherein:

FIG. 1 is a view in perspective of a typical piecepart;

FIG. 2 is a view in perspective of a ribbon layout, illustrating various stages of fabrication of the piecepart of FIG. 1 with a progressive die;

FIG. 3 is a functional flow chart illustrating the method of the present invention;

FIGS. 4, 5 and 6 diagrammatically illustrate three respective bending operations employed in forming metal piece-parts with dies;

FIG. 7 illustrates a cube of piecepart material at rest;

FIGS. 8 and 9 illustrate the cube of FIG. 7 under compression and tension forces, respectively;

FIG. 10 is a stress vs. strain plot for a typical piecepart material;

FIG. 11 is a plot illustrating stress produced in one plane by strain in a perpendicular plane;

FIG. 12 illustrates the deformation of a portion of a piecepart during a bending operation by a die;

FIG. 13 illustrates the deformation of the piecepart portion of FIG. 12 after the bending is removed;

FIG. 14 is a block diagram illustrating one approach to achieving the process step of FIG. 3 wherein the bent outline is transformed to a flat outline;

FIGS. 32 through 39 are plots of various signals employed in the circuit of FIG. 31;

FIGS. 40, 41 and 42 are schematic diagrams of further portions of the block diagram of FIG. 30;

FIGS. 44, 45 and 46 illustrate outline signals representing the flattened piecepart of FIG. 1 during respective stages of the blanket transformation process step;

FIGS. 47 and 48 illustrate respective portions of the flattened piecepart outline;

FIG. 49 is a schematic diagram of a portion of the block diagram of FIG. 43;

FIGS. 50 through 53 illustrate a piecepart having an internal hole during respective stages of the blanket transformation step of the present invention;

FIGS. 54 and 55 illustrate a piecepart having an interior spiral shaped opening during respective stages of the blanket transformation step of the present invention.

DESCRIPTION OF PREFERRED EMBODIMENT

Figure 15:
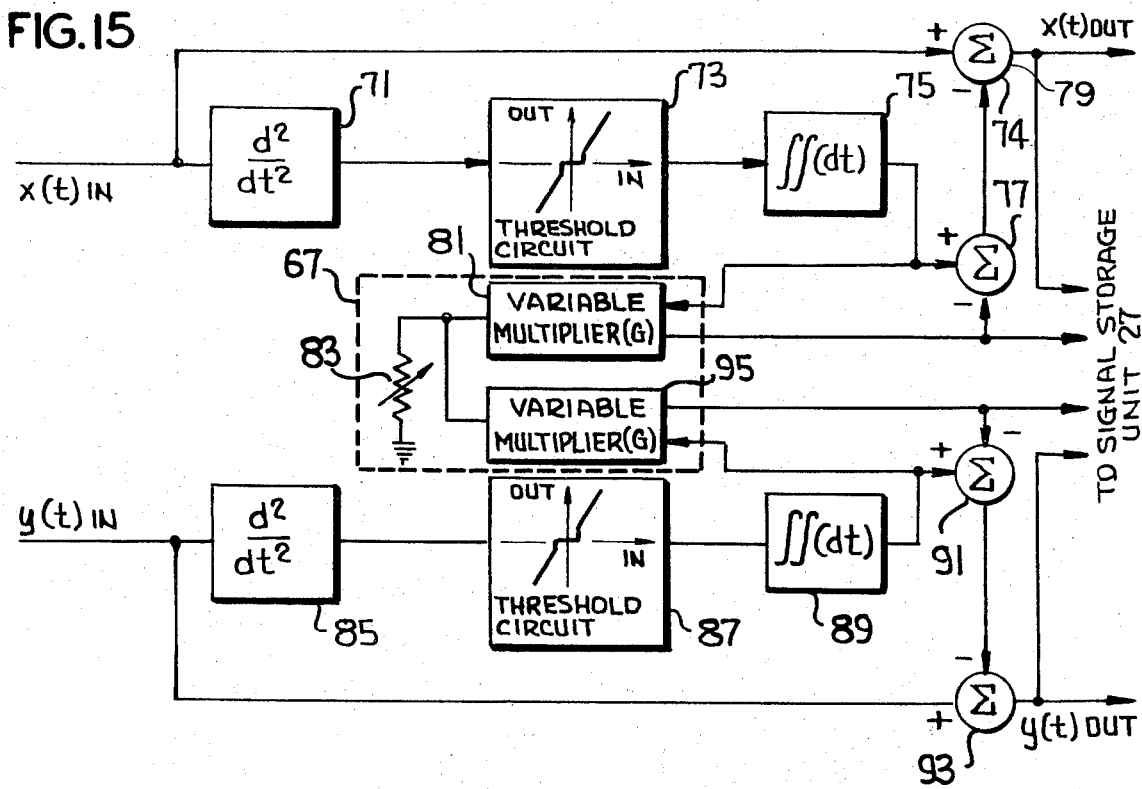
FIG. 15 is a schematic diagram illustrating the blocks of FIG. 14 in detail.

Referring specifically to FIG. 1 of the accompanying drawings, there is illustrated a typical piecepart 10 to be mass-produced with the aid of a die fabricated according to the principles of the present invention. Piecepart 10 is made of metal and includes a cup 11 having a wide planar lip 13 from which a curved handle 15 extends in a plane generally perpendicular to the plane of the lip. The remote extremity of handle 15 has a hole 14 defined therethrough in a direction perpendicular to the plane of the handle.

Piecepart 10 is typical in that its manufacture involves the operations of piercing, bending, forming (drawing a cup), coining or embossing, and blanking at the locations indicated in FIG. 1. In the description which follows, most of the process steps incorporated in the present invention are described in terms of producing a progressive die for use in manufacturing piecepart 10. In some instances, however, to faciliatate understanding of the process steps, simpler piecepart configurations are hypothesized.

FIG. 2 is a perspective view of a Ribbon Layout illustrating a strip of sheet metal stock 16 as it would appear upon removal from a progressive die during the manufacturing process. The various operational stages or stations along the ribbon have been numbered 1 through 7 in order that the corresponding operations occur. At station 1 the die pierces two round holes and two oval holes 19, 20 in the stock strip. The two outermost holes 17, 18 are used at each station to pilot the sheet metal stock 16 into alignment with the die. The two oval holes 19, 20 are used to provide strain relief in the metal during forming operations to be described.

At station 2 a characteristically hourglass shaped piece of scrap is removed from the left side of station. This operation is equivalent to a piercing or blanking operation mechanically, but since it removes scrap to form a portion of the outline it is designated as gutting.

The procedure at station 3 involves forming of the metal by drawing cup 11. The total volume of metal does not change during this drawing operation. The metal which forms cup 11 is "dragged in" from the original surface sheet, so that the overall dimensions of the original outline are reduced. This deformation is one which is difficult to handle precisely in conventional die design for reasons described below. It should be noted that this example shows cup 11 being formed in one drawing operation; this is not always the case. For cups of any appreciable depth, drawing must be accomplished in successive stages of operation, each involving a deeper draw than the previous stage, with the last stage slightly overdrawing the cup to allow for springback. The function of oval holes 19, 20 can be seen at stage 3 in that they have changed configuration to compensate for the deformation of the material.

At station 4 stock 16 experiences gutting and piercing operations which form the outline of piecepart 10 more accurately. In addition, hole 14 and two additional holes, to be used for piloting are pierced.

An additional gutting operation is effected at station 5 to define the contour of handle 15.

Station 6 illustrates the result of a combined coining and bending operation. As at station 3, a bending operation cannot always be completed in one stage since overbending is often necessary to allow for metal springback to the desired bend angle. Coining or embossing, as illustrated at station 6, may be for purely decorative or labeling purposes, or it may serve a mechanical function, such as the longitudinal grooves in a door key blank. The requirements for precision in functional coining are naturally much greater than for decorative coining.

Station 7 illustrates the final outline blanking operation in which piecepart 10 is freed from the scrap.

The order of operations and their number are governed by several design considerations relating to the stock material from which piecepart 10 is to be manufactured. The Ribbon Layout of FIG. 2 may work very well for manufacture of the piecepart from soft aluminum but not from hard spring steel. The operational stages are also affected by the type of press available and the materials available for use in the die (e.g. a tool steel die or a tungsten carbide die). In general, a die design of more than moderate complexity would not be done precisely alike by two or more experienced designers. This only serves to emphasize that die design is an art which heretofore has been extremely dependent upon the experience of the designer. The method of the present invention is sufficiently versatile to allow for variations in material properties of the piecepart stock and the die materials while producing die which is sufficiently complex to perform as required but which is not so overdesigned as to be uneconomical.

The method of the present invention may be best understood by reference to FIG. 3. The overall method if first described in relation to this Figure and each portion of the process is described subsequently in greater detail. The method is initiated by converting a drawing 21 of piecepart 10 into co-ordinate signals. This may be achieved with a drawing co-ordinate digitizer machine 23, a device well known in the art. Digitizer 23 combines a viewer 25 with a structure of arms, linkages, and electro-mechanical conversion apparatus to provide a set of co-ordinate signals indicating the position of the center of the viewer 25 as it is guided over the drawing by an operator. Typical digitizers are the Gerber Co-ordinate Digitizer, Model GCD, manufactured by Gerber Scientific Instrument Co., South Windsor, Connecticut, and the Bendix Datagrid Digitizer manufactured by the Bendix Computer Graphics Division, Farmington, Michigan.

It is customary for co-ordinate digitizers to operate by converting the viewer position into Cartesian or rectangular co-ordinates, but such co-ordinate system is not a necessary feature of the present invention. Any other system of co-ordinates, such as polar orthogonal co-ordinates, elliptic orthogonal co-ordinates, trapezoidal non-orthogonal co-ordinates, spherical polar co-ordinates, and others could also be used without departing from the spirit and scope of the invention. Furthermore, in the absence of a co-ordinate digitizing machine, the co-ordinate information could be found by measurement from the drawing by an operator using a ruler. This information could then be typed into the system via an input keyboard; or corresponding controls can be adjusted to produce requisite current, voltage, or the like.

If Cartesian co-ordinates are employed, the digitizer output signals represent the $x$, $y$, and $z$ co-ordinates of each significant point on piecepart drawing 21. Such points are found at the intersections of two lines which form portions of the outline of piecepart 10. In addition, the center location, radius, and endpoint angles of any circular segments in the outline would be recorded. Three dimensional features of the object, such as cup 11, would be represented by co-ordinates defining the main axis line of the cylinder and the radius of the cylinder, together with the depth of the cylindrical section. If a spherical cup were to be formed, co-ordinate signals representing the center point of the sphere, the radius of the sphere, and the depth of the cup would be used. For more elaborate regular three-dimensional shapes, such as ellipsoids, paraboloids, and the like, suitable co-ordinates exist and are well known in the field of analytic geometry. For irregular shapes not having a precise geometric character, it is well known in the field of mathematical interpolation that the surface can be subdivided into smaller sections of approximately equal size, and the contour within that small section can be described accurately by a combination of signals giving the intercept, slope, curvature, and skewness of a spline function. The spline function is well known to give a precise fit to formable metal surfaces, well within the accuracy of any machining process.

The $x$, $y$, and $z$ spatial co-ordinate signals provided by digitizer 23 are stored in signal storage unit 27 and applied to a spatial to time function converter 29. Storage unit 27 may comprise any suitable storage medium wherein the stored contents are directly accessible, such as magnetic disc or core. Of course, the storage unit must be compatible with the signals to be stored. For purposes of this disclosure, analog (i.e. — continuous) electrical signals are considered, although it is to be understood that digital signals and non electrical media, such as fluid flow, are appropriate for use in the method of the present invention.

Spatial to time function converter 29, as the name implies, converts spatial co-ordinate signals $x$, $y$, and $z$ provided by digitizer 23 into time signals $x(t)$, $y(t)$, and $z(t)$. This conversion process is well known in the art and involves scanning individual spatial lines in the piecepart, as represented by signals $x$, $y$, and $z$, at a specified rate, and providing at each point a signal amplitude for $x(t)$, $y(t)$, and $z(t)$ which correspond to the $x$, $y$, and $z$ co-ordinate values, respectively, at that point. At any time during the scan, the amplitudes of $x(t)$, $y(t)$, and $z(t)$ represent three co-ordinates which define a point on the piecepart 10. These three signals, therefore, totally represent piecepart 10, as is diagrammatically illustrated at the output line of unit 29.

The signals derived by converter 29 are stored in storage unit 27 and applied to a unit 31 which transforms bent portions of piecepart 10 into flat form. The output signals from transformation unit 31, therefore, represent, in the time domain, piecepart 10 with handle 15 bent back into the plane of lip 13. This un-bending transformation is effected by identifying all plane surfaces which do not lie in the flat plane of lip 13. The fold or bend locations are identified as a part of the signal information, but do not appear as a bend in the transformed signals. During this transformation, compensation must be provided for deformation of the metal at the fold. This is discussed in greater detail hereinbelow.

The next transformation, provided by unit 33 develops the stretched material back into the plane of lip 13 to describe the inverse process to the drawing or forming of cup 11. The diagram at the output line of unit 33 shows pictorially the geometric shape represented by the output signals from that unit. It will be noted that the outline of the piece is larger then it was when represented by the output signals from unit 31. The exact details of this transformation are described more fully below.

The signals representing the flat outline are applied to rotational transformation unit 35. The transformation at unit 35 comprises rotation or replacement of the outline of the developed part onto sheet metal strip stock 16 in such a way that the optimum utilization of sheet metal material is realized. The result of this transformation is shown pictorially at the output line of unit 35. The method of this transformation is also described in greater detail below.

The next transformation is characterized as a blanket transformation and is performed at unit 37. This transformation encloses the overall outline of the transformed part in a blanket line, which is a completely convex line enclosing the outline of the developed part and bridging over any valleys or projections of that original outline which are not inherently convex. All of the portions of the original outline which do not coincide with the blanket line are candidates for separate punching treatment (that is, punching at a different stage of the die than the outline). Whether or not an outline portion should be separately punched is determined by blanket transformation unit 37 which examines the bending moment stress which would be produced in the die structure if the portion in question were to be punched or blanked as part of the overall outline. If such a stress would exceed the safe limits for the tool material, this portion of the outline is punched separately in another stage of the die. This portion of the process, as well as a similar operation applicable to interior holes within the piecepart, is described more fully below.

A pictorial representation of the effect of this transformation is illustrated at the output line of unit 37. The long projecting opening in the original outline between the handle and the lip has been separated and will be subsequently treated as though it were an interior hole to be punched in a separate stage of the die.

As a result of the transformations in units 31, 33, 35, and 37, the operations to be performed by the die have been suitably analyzed and segregated as individual punching, forming, and bending operations. A final blanking outline has been determined so that the finished piecepart 10 can be separated from the sheet metal stock 16. The final transformation in the process is carried out in unit 39. This is a sorting transformation which merely rearranges the order of the stored signal information, so as to carry out the individual die operations in the proper physical order. This transformation insures that holes are not punched too closely together at the same die station and that forming and bending and piercing operations take place in a proper order. At this point the signals have undergone sufficient modification thru the sequence of transformations that they now give a full description of the operations carried out by the final die. If the signals were converted to co-ordinate information at this point they would give a pictorial representation of the complete ribbon layout, as shown pictorially at the output line from unit 37.

Signal conversion unit 41 performs conversions needed to convert the sorted signals stored in the system into a form suitable for use by either a machanist or a controllable machine tool. Several forms of output parameters are designated in FIG. 3. These may be electrical signals for direct connection to controllable machinery, such as a numerically controlled milling machine; or a punched tape for later use on a controllable machine; or signals suitable for connection to plotting or drawing equipment to produce physical drawings on paper, microfilm, or other medium.

The machine control transformation in unit 41 may take into account the limitations of machining so that the forming members and other portions of the die can be appropriately segmented as well as being fastened with proper conventional types and sizes of bolts, dowels, and other standard shop hardware. Thus the apparatus in unit 41 may easily be used to produce auxiliary output information of great convenience and value to the machinist such as a bill of materials listing the necessary tool metal stock and fastening hardware needed for assembly of the die. The corresponding form of output signals, if connected directly to a machine tool, would actually cause that tool to cut a designated die part from a block of tool metal. The same information, if directed to a drawing machine, would produce a drawing of the corresponding finished die. This would be valuable to the machinist for purposes of checking the assembly and correctness of machining operations.

Having described a general outline of the process in relation to FIG. 3, a more detailed description will now be provided for each of the transformations involved in the overall operation. First to be considered is the transformation performed in unit 31. This comprises development of bends back into a flat surface. The deformation of metal involved in such an operation can be more easily understood by reference to FIGS. 4 through 13.

FIGS. 4, 5 and 6 illustrate three types of bending operations, respectively, employed in metal forming with the use of dies. FIG. 4 illustrates the most usual type of bending through the application of a bending moment to a metal piece 43 as it is bent around a curved projection in a die 45. FIG. 5 illustrates a less usual type of bending in which the metal piece 47 being bent by die 49 is under tension applied outside the region of bending. FIG. 6 illustrates a process sometimes employed in bending, called "setting" a bend, in which the nose 50 of the inner die block 53 around which the metal piece 51 is being bent has a smaller, sharper radius then the external forming metal die block 55.

Returning to FIG. 4, metal piece 43 undergoing a bending operation of the type illustrated is partially in compression and partially in tension. A neutral axis, indicated on the figure by a dashed line along the middle of the cross section of metal piece 43, separates the two regions. In the curved region of metal piece 43 the metal towards the inside of the bend is undergoing compression while the metal towards the outside of the bend is undergoing tension. At the neutral axis, which is approximately halfway between the two surfaces of the metal, the metal is neither in tension nor compression and is not deformed along the direction of the neutral axis. Deformation of the metal piece is indicated schematically by the solid lines 44 drawn between the two surfaces of the piece. Lines 44 crowd together towards the inside of the bend and are spread apart towards the outside of the bend.

Referring to FIG. 5, it becomes clear that if sufficient tension is applied to the sheet metal it can act to cancel out the compression which would normally exist towards the inside of the bend. Thus, metal throughout the bent region is in tension at all points. The metal towards the inside of the bend is in slight tension, while the metal at the outside surface of the bend is under tension equal to the sum of the tension produced by moment bending alone plus tension added by external forces. This situation can be visualized as one in which the neutral axis has been moved completely to the inside region of the bend and no longer resides within the sheet metal itself. This situation is represented schematically by the solid lines 48 drawn between the two surfaces of the sheet metal piece 47. Lines 48 have moved grossly further apart in the bending region to indicate the overall state of tension.

FIG. 6 illustrates the deformation involved in a set bend. In this situation, the metal piece 51 is compressed in a direction perpendicular to its two surfaces. The forces induced in the metal during this operation are perpendicular to the forces induced by moment bending. The deformations involved here are represented schematically by the alternate crowding and spreading of the small solid lines 52 drawn between the two metal surfaces. Although this process weakens the metal by making it thinner in the region of the bend, the overall compressive forces produced during a set bend produce a plastic deformation which has less tendency to spring back.

The deformations of the metal involved in these operations can be more easily understood with reference to the following discussion. FIG. 7 illustrates a small cube of material 57 oriented in a rectangular or Cartesian co-ordinate reference frame. The three space axes of this reference frame are labeled with the conventional letter synbols $x$, $y$, and $z$. FIG. 8 illustrates the effect of a compressive force acting parallel to the $x$ axis. Under the action of this compressive force, the cube is squashed in the $x$ direction but expands in the $y$ and $z$ directions to form a new FIG. 57' which is no longer cubical in shape. FIG. 9 illustrates the effect of simple tension in the $x$ direction. Cube 57 sample expands in the $x$ direction and contracts in the $y$ and $z$ directions into a new configuration 57'' which is no longer cubical. The effects of forces acting in the $y$ or $z$ directions are similar in form. The effects of compound forces acting in more than one direction at a given time are analyzed as a combination of compressive and expansive effects.

FIGS. 10 and 11 provide a more quantitative description of the relationship between the stress applied to the object and the strain or deformation of that object. The graph of FIGS. 10 and 11 represent the relationship between the forces and deformations in the direction parallel to and perpendicular to the direction of applied force, respectively. In FIG. 10, the point labeled A represents the relaxed state of the object, in which state no force is applied and no strain or deformation exists. If a stress is applied to the body the deformation increases in a manner approximately proportional to the stress until a maximum value is reached, designated in the drawing as region B. This region is usually called the yield point. Its exact value varies among different metallic materials, and also varies slightly between different samples of the same material due to differences in chemical composition of the alloy, heat treatment, and other effects. However, the yield point can be measured to the necessary degree of accuracy for purposes of this invention. If the applied stress is smaller then the yield point stress, the deformation will disappear when the stress is removed. That is, following the plot in FIG. 10, the stress-strain curve returns to point A after removal of the stress.

If, on the other hand, the applied stress exceeds the yield point, going for example to point C, the material is permanently deformed even after the stress is removed. This is illustrated as a return to point D after removal of the stress. The region beyond point B is usually called the plastic region, to distinguish it from the region below yield point which is usually called the elastic region. If a stress is applied after there has been an initial deformation, the stress-strain curve indicates a deformation starting from point D and proceeding towards point E and then to a second plastic deformation region if the necessary stress is applied. Of course, sufficient stress can lead to breakage of the material, as shown at point $x$.

Whereas FIG. 10 illustrates the relationship between stress and strain in the same spatial direction, FIG. 12 illustrates the relationship between stress applied in one spatial direction and strain in another direction perpendicular to the direction of applied stress. The stress-strain relationship in this case is qualitatively similar to FIG. 10, except that the application of a compressive stress yields an expansive strain rather than a compressive strain in the perpendicular direction.

FIGS. 12 and 13 illustrate the effects of a bending deformation in greater detail. FIG. 12 illustrates the shape of a metal piece 59 during the bending operation itself. The portions of the die 61 surrounding the sheet metal are performing an overbend, to permit a bend of approximately 90°. During this overbend, metal follows the contour of the nose 63 of the internal portion of the die. Thus, the strain or deformation which results from this change in shape can be seen, at each point in the curved region, to be geometrically related to the difference in the circumference of the circles at the inner and outer surfaces of the metal in the bent region. A dashed line has been drawn to represent the position of the neutral axis. The neutral axis is approximately halfway between the inner and outer surfaces of the bent metal piece 59. Portions of the metal on the inside region of the neutral axis are in a state of compression and are squeezed down to a smaller size in the direction of curvature, while the portions of metal outside the neutral axis are in a state of tension and the metal is being stretched. From the geometric relationships of the deformation shown in FIG. 12, it is very straight forward, but tedious, to find the stress and strain at each point within the metal, by using the stress-strain relationship for the particular metal, as represented in FIGS. 10, 11. If the bend has been sufficiently great, portions of the metal in the bend region go into the plastic region of deformation. With reference to FIG. 10, we might consider that some portion of the metal has been stressed to a point corresponding to that labeled C, on the diagram. Therefore, when the bending force is removed, as shown in FIG. 13, the metal springs back. This spring back effect can be quantitatively found on FIG. 10 by observing the difference in the strain at points C and D.

The transformation performed by unit 31 in FIG. 3 may now be readily understood in view of the information presented in the preceding paragraphs. FIG. 14 illustrates a more detailed description of the internal operations performed by unit 31. First the curved outline signals $y(t)$, $x(t)$, $z(t)$, the original piecepart configuration, are transformed at units 65 and 67 into signals representing a flattened or un-bent configuration, plus a bending component corresponding to elastic deformation. The unbending portion of the transformation is carried out by unit 65; compensation for elastic deformation is effected by unit 67. The output signals provided by unit 65, therefore, represent the original piecepart, altered to the extent that all bends have been flattened and replaced by smaller bends representing the overbending required to compensate for spring back. This is the overbending illustrated in FIG. 12. The compensated signals are then completely flattened at transformation unit 69, the overbending component being removed in the process. The resultant output signal, therefore, represents the piecepart with all bent portions returned to the plane of the sheet metal stock.

The precise nature of the transformations occurring in the sub-system of FIG. 14 may best be understood with reference to the detailed circuit diagram of FIG. 15 and the graphs of FIGS. 16 through 26. Specifically, FIG. 15 illustrates a circuit which can be utilized to perform the function of transformation unit 65 in FIG. 14. The portion of the FIG. 15 circuit enclosed in dotted lines represents unit 67 of FIG. 14. The same circuitry employed for unit 65 can be repeated for unit 69.

In order to simplify the description and facilitate understanding, curve removal is described herein on a two-dimensional basis rather than a three dimensional basis. It is understood, however, that whereas on $x(t)$ and $y(t)$ are transformed in the following description, the $z(t)$ signal is also similarly transformable for curves extending into the z plane.

The $x(t)$ signal, in FIG. 15, is applied to a double differentiator circuit 71, which may be two series differentiators. The resulting second derivative signal is applied to a threshold circuit 73 having a "dead zone" (i.e. — no response) for low level input signals. The purpose of circuit 73 is to remove low amplitude noise signals which are enhanced and/or produced by double differentiator 71. The output signal from the threshold circuit is then applied to a double integrator circuit 75 which is initialized to provide zero level output signal in the absence of input signal.

The output signal from double integrator 75 is applied to a summer circuit 77. Ignoring other input signals to summer 77, for the moment, the output signal from the summer is applied to a further summer 79 where it is subtracted from the original $x(t)$ input signal.

The circuit, as thus far described, operates in the following manner. The output signal from double differentiator 71 appears as a non-zero signal only in those regions where $x(t)$ curves, and has an amplitude depending upon the degree of curvature in $x(t)$. This "curvature" signal is then doubly integrated, providing a signal which conforms to the configuration of the $x(t)$ input signal, but wherein initial straight portions of $x(t)$ are removed. Subtracting this signal from $x(t)$ at summer 79 provides an output signal from which curvature has been removed. This operation will become clearer from subsequent description relating to the graphs of FIGS. 16 through 26.

The output signal from double integrator 75 is also applied to a variable multiplier circuit 81 in the stress-strain transformation unit 67. The unit signal to multiplier 81 is multiplied by a factor, G, whose value is determined by the setting of variable resistor 83 on the basis of the stress-strain characteristic of the working metal. Typically, G will have a value on the order of 0.05. If this multiplied signal is now subtracted from the doubly integrated signal at summer 77, the resulting signal will represent the curvature of $x(t)$ less an overbending compensation factor. When the output signal from summer 77 is subtracted from $x(t)$ at summer 79, the resulting signal represents $x(t)$ with its initial curves removed but with a slight overbend component to accommodate spring back effects.

The $y(t)$ signal is similarly treated, being applied, in turn, to a double differentiator 85, a threshold circuit 87, and double integrator circuit 89. Summers 91 and 93 correspond to summers 77 and 79, respectively, for the $x(t)$ signal; and variable multiplier 95 in stress-strain transformation unit serves the same function for $y(t)$ as multiplier 81 serves for $x(t)$.

Figure 16:
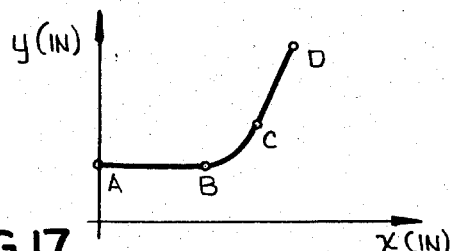
FIGS. 16 through 26 are plots of various signals employed in the circuit of FIG. 15.
Figure 17:
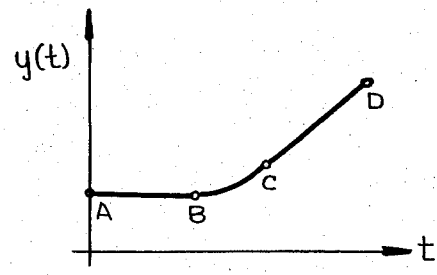

Referring now to FIG. 16 there is illustrated, in terms of spatial co-ordinates y and x, a typical surface bend to be straightened by the transformation circuit of FIG. 15. Note that the surface is straight between points A and B, curves between B and C, and straightens out between C and D. The $y(t)$ and $x(t)$ signals representing the spatial configuration of FIG. 16 are plotted in FIGS. 17 and 18 respectively. Once again, note the curvature existing between points B and C only, in both $y(t)$ and $x(t)$.

Figure 19:
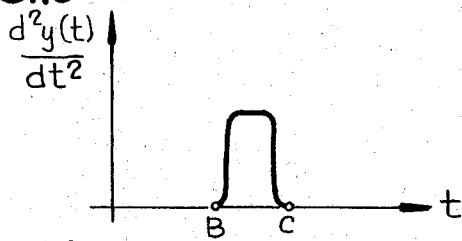

Considering the $y(t)$ signal first, the effects of double differentiation of $y(t)$ are illustrated in FIG. 19 where the output signal from unit 85 is plotted as a function of time. Note that the curve of FIG. 19 rises above zero only in the region between points B and C, the region of curvature.

Figure 20:
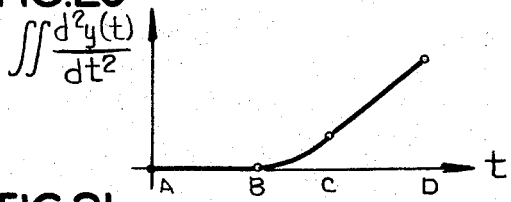

Doubly integrating the signal of FIG. 19 produces the signal of FIG. 20. Note that the latter is zero prior to point B, increases at an increasing rate between points B and C, and increases at a constant rate between points C and D. In effect, the signal of FIG. 20 represents $y(t)$ in FIG. 17 except that the initial straight portion (between A and B) has been deleted. If the signal of FIG. 20 were subtracted from that of FIG. 17, the result would be a constant level value of $y(t)$. Of course necessary scaling, by means of amplifiers, etc. may be required to render signal levels compatible, but this is well within the skill of those familiar with electronics.

Figure 21:
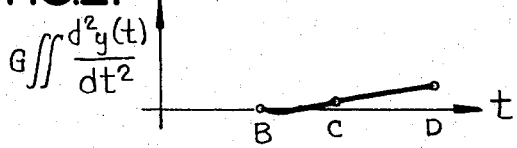

FIG. 21 represents the signal of FIG. 20 multiplied by G and therefore corresponds to the output signal from multiplier 95. Note that this signal, too, is non-zero only between B and D, and in fact is merely a scaled-down version of the signal of FIG. 20. Subtracting the signal of FIG. 21 from the signal of FIG. 20 (at summer 91), and then subtracting the difference from $y(t)$ at summer 93 provides the signal of FIG. 22. Note that this latter signal exhibits a slight degree of curvature between B and C. This curvature represents the overbending required to compensate for spring back when the metal piecepart is bent in the die.

Figure 22:
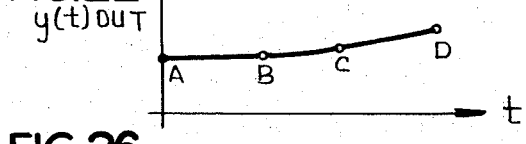

The signal of FIG. 22, designated $y(t)$ OUT, is then passed through transformation unit 69 of FIG. 14. The latter has the same configuration illustrated in FIG. 15, absent the effects of unit 67 and summer 91, the output signal from double integrator 89 being applied directly to summer 93.

Figure 24:
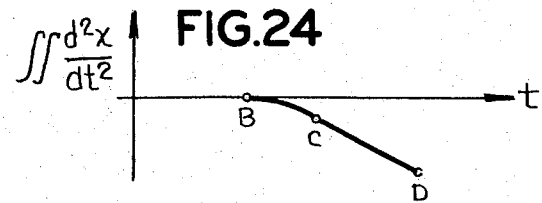
Figure 24A:
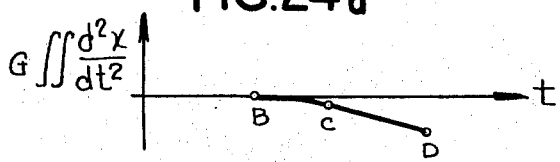
Figure 25:
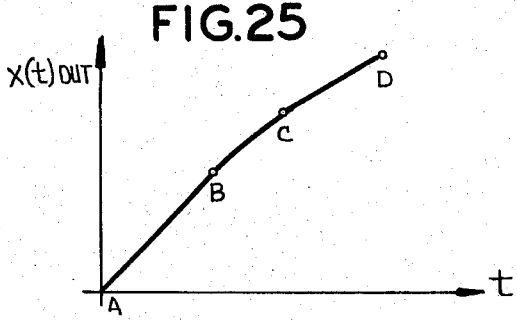

A similar analysis may be made of the transformation of the $x(t)$ signal applied to the circuit of FIG. 15. Upon double differentiation at unit 71, $x(t)$ is transformed to the signal pulse illustrated between points B and C in FIG. 23. This pulse is then double integrated at unit 75 to provide the signal illustrated in FIG. 24. From this is subtracted (at summer 77) the scaled down version of the same signal, illustrated at FIG. 24a, and representing the overbending component required to compensate for spring back in the x plane. The result of the subtraction at summer 79 is illustrated in FIG. 25.

Figure 26:
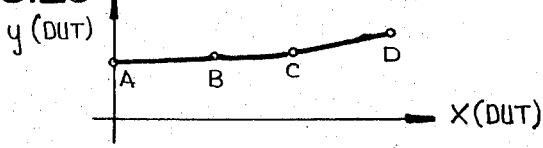
Figure 18:
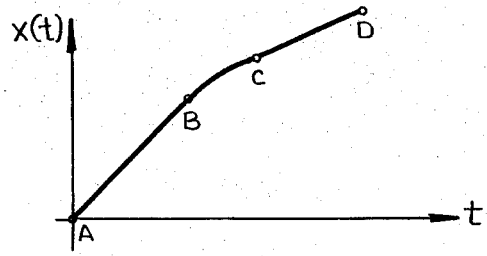
Figure 23:
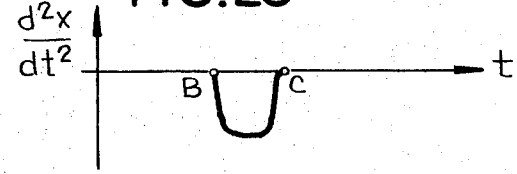

The spatial co-ordinate counterpart of $x(t)$ OUT (FIG. 28) and $y(t)$ OUT (FIG. 22) in the $x$-$y$ plane is illustrated in FIG. 26. Note the slight curvature between point B and C representing the compensatory overbend. The $x(t)$ OUT and $y(t)$ OUT signals are then both flattened entirely in unit 69 of FIG. 14.

The basic operation of the circuit of FIG. 15 is to subtract from $x(t)$ and $y(t)$ the portions of these co-ordinate signals which deviate from a straight line of initial slope, leaving $x(t)$ and $y(t)$ with second derivatives which are zero except for the small overbending component. Since $x(t)$ and $y(t)$ are scanned at the same uniform rate, transformation of curved surfaces into straight surfaces, by the above-described method, preserves the true length of the neutral axis (reference FIG. 4) after the transformation. The distance along the surface between points A and D is the same before and after transformation.

The transformations performed by unit 33 of FIG. 3, which transformations develop drawn shapes back into the flat surface, are of the same general character as described in relation to FIGS. 14 and 15. The only differences reside in details of the precise shape involved in the deformation. In fact, the same mechanism, with different scaling, would be employed to perform the transformations required of units 31 and 33 of FIG. 3. The determination of this scaling would be readily effected by one of ordinary skill in this art, see "Condensed Practical Aids for the Experienced Die Engineer", by Engineering Staff of Falcon Engineering and Tool Co., 5005 West Lake Street, Chicago, Illinois, 60044, 1949, pages 2-17 and 33-132; "Die Design Handbook", F. W. Wilson, Editor in Chief, McGraw-Hill Book Co., New York, 1955, Sections 6 and 11; and "The Mathematical Theory of Plasticity" by R. Hill, Oxford University Press, 1950, Chpater 11.

The rotational transformation performed by unit 35 of FIG. 3 is described in greater detail in relation to FIGS. 27 through 42. This rotational transformation, although necessary for proper mechanical functioning of the working die, is also important economically because it allows the manufacturer of the piecepart to obtain the maximum utilization of the sheet metal from which the piecepart is to be manufactured.

Figure 27:
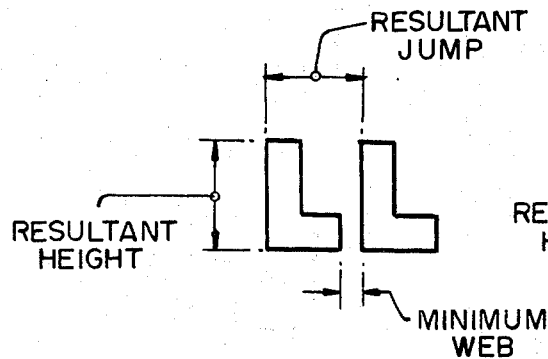
FIGS. 27, 28 and 29, illustrate respective rotational positions of a typical piecepart.
Figure 28:
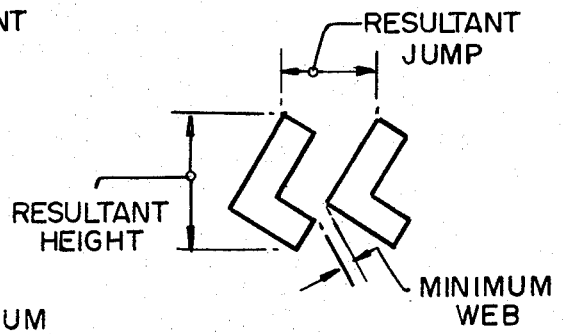
Figure 29:
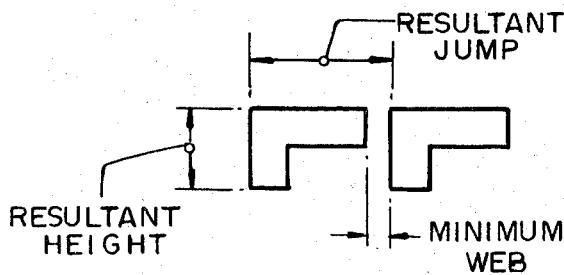

Rotational transformation unit 35 transforms signals representing the developed flat outline of the piecepart through a full rotation in incremental steps. At each step a replica of the signals describing the outline of the developed flat piece-part is translated a horizontal distance at least as great as a minimum web distance. This minimum web distance, which is the distance between adjacent pieceparts in FIG. 2, is usually chosen to be some small multiple of the sheet metal stock thickness. Specifically, the web distance is chosen to be just large enough to insure that the scrap metal portions of the sheet metal strip do not separate completely during press work operations, thereby permitting all scrap to be removed from the die after the forming and punching operations. FIGS. 27, 28 and 29 illustrate pictorially the original and replica outline of an L-shaped piecepart at three respective incremental steps during the rotational transformation. In FIG. 27 the L-shpaed piecepart is oriented in a vertical position, considered herein to be 0° rotation. The replica adjacent to it is separated by a small distance which is labeled "Minimum Web." The horizontal distance between corresponding points on the original and replica outline is labeled "Resultant Jump." The latter is determined by the angular orientation, the width of the piecepart, and the web thickness. The "resultant height" of the piecepart is also labeled. The total amount of sheet metal material which must be dedicated to the manufacture of one piecepart is a rectangle of area equal to the product of the resultant jump and the resultant height. This area, naturally, does not include a residual scrap strip along the two edges of the sheet metal stock which would be the same in any case.

If, as illustrated in FIG. 28, the original and replica outlines are rotated through the same angle, (i.e. — 30°) and re-spaced only by the minimum web, the resultant jump and resultant height are different than in FIG. 27. Likewise, a still different resultant height and resultant jump result for a 90° rotation as illustrated in FIG. 29. The object of the rotational transformation is to find that angle of rotation which yields a minimum amount of scrap. This is quantitatively reflected as that piecepart orientation resulting in the minimum product of the resultant height and resultant jump.

Figure 30:
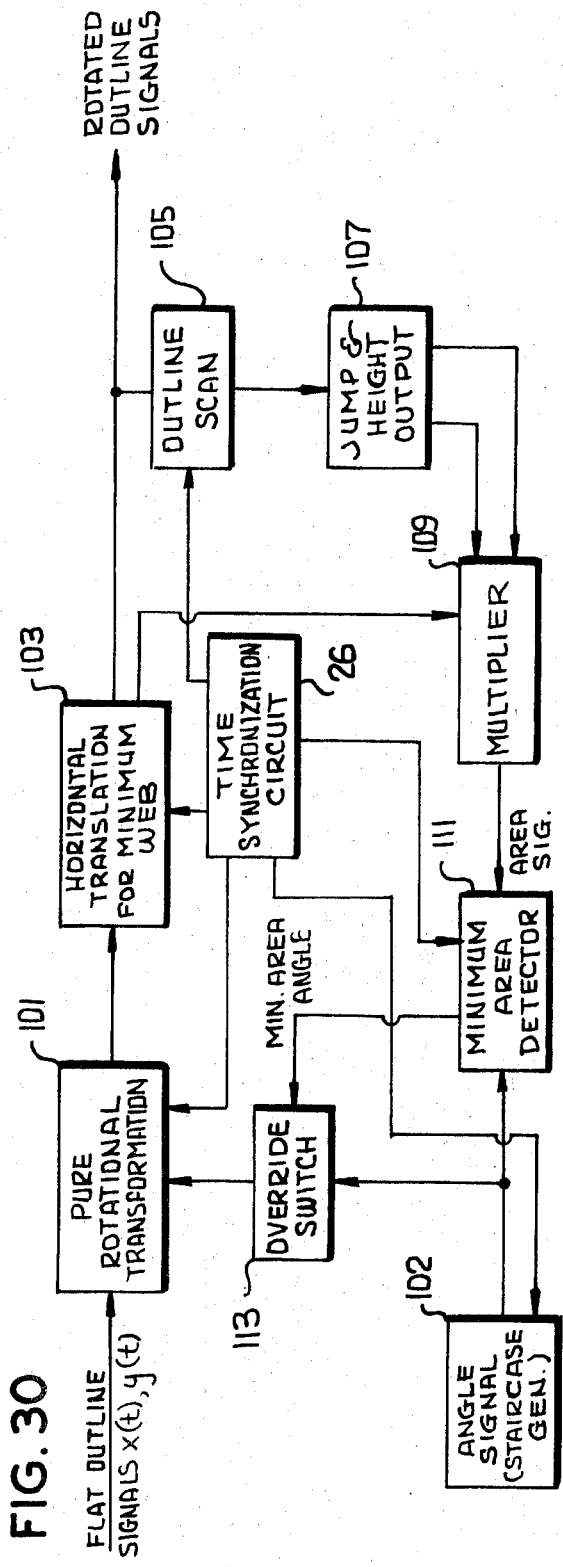
FIG. 30 is a block diagram illustrating the rotational transformation function of FIG. 3.

The steps performed during the rotational transformation process can be more easily understood in relation to FIG. 30. Flat outline signals, labeled $x(t)$, $y(t)$ are rotated through a first incremental step in unit 101. The latter receives an angle signal from staircase generator 102 to control incremental rotation. Following this a replica outline is horizontally translated from the original outline by adding a suitable value to the horizontal $(x)$ co-ordinates of the outline. This is done by unit 103. Unit 105 then scans the outline of the part to locate the maximum and minimum vertical and horizontal co-ordinates and the horizontal displacement between corresponding points on the original and replica outlines. This information is provided for unit 107 which converts the information into jump and height signals. The latter are applied to multiplier 109 which provides a signal proportional to sheet stock area which would have to be dedicated to a piecepart if the piecepart were oriented at the angle of the first incremental step. This area signal is applied to detector 111 along with the angle signal originating in unit 102. This angle signal, as mentioned above, indicates and controls the angle of rotation in effect at any instant of time. The minimum area signal detected by detector 111, causes the corresponding angle signal to override the angle signal from unit 102 at override switch 113. The switch then applies this overriding a constant signal, representing the angle of minimum area, to rotational transformation circuit 101. Thus, the transformed signals, which only then emerge from the circuit of FIG. 30, are those which are rotated to the correct angle for minimum scrap.

Figure 31:
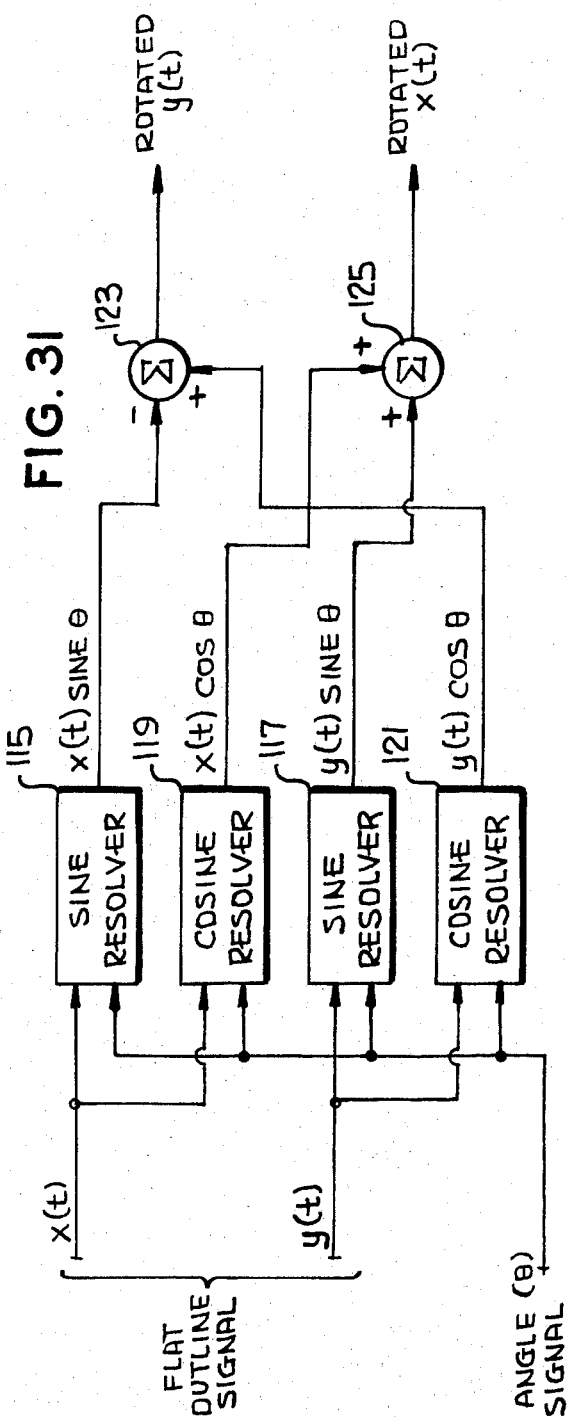
FIG. 31 is a schematic diagram of a portion of the block diagram of FIG. 30.

The details of operation of the system of FIG. 30 are better understood from the following description. Referring to FIG. 31, there is illustrated circuitry for performing the rotational transformation required of unit 101 of FIG. 30. Again, for simplicity of explanation, it is assumed that a two-dimensional part is being processed and lies in the $x$-$y$ plane.

The input $x(t)$ signals in FIG. 31 can be repetitively reproduced from storage circuit 27 as needed, reproduction being conrolled by time synchronization circuit 26. The basic components of the circuit of FIG. 31 are sine resolvers 115, 117 and cosine resolvers 119, 121. These resolvers are well-known, commercially available products which respond to an input signal and an angle signal to provide an output signal proportional to the product of the input signal amplitude and the sine (or cosine) of the angle represented by the angle signal. $x(t)$ is applied as an input signal to sine resolver 115 and cosine resolver 119. $y(t)$ is applied as an input signal to sine resolver 117 and cosine resolver 121. The staircase angle signal, $\theta$, from generator 102 (FIG. 30) via override switch 113 is applied to each of the four resolvers.

The output signal $x(t) \cdot \sin \theta$, from sine resolver 115, is subtracted at a summer 123 from the output signal $y(t) \cdot \cos \theta$ provided by cosine resolver 121. The signals provided by resolvers 119 and 117, namely $x(t) \cdot \cos \theta$ and $y(t) \cdot \sin \theta$, respectively, are added together at summer 125. The output signal from summer 123 represents the $y(t)$ component of the rotated piecepart outline and the signal provided by summer 125 represents the $x(t)$ component of the rotated piecepart outline. This fact is clearly demonstrated with reference to FIGS. 32–39.

FIG. 32 is an x–y plane plot of an L-shaped piece-part whose $x(it)$ and $y(t)$ co-ordinate signals are assumed to be applied to the circuit of FIG. 31. Outline scan of the piece-part is along points of intersection, A through G. The $(x,y)$ co-ordinates of intersection points A, B, C, D, E, F and G are (2,1), (4,1), (4,2), (3,2), (3,4), (2,4) and (2,1), respectively. The $y(t)$ and $x(t)$ plots for the part of FIG. 32 are illustrated as curves 127 and 129, respectively in FIGS. 33 and 34. In these latter Figures, and in FIGS. 35, 36, 37a and 38, the time scale is selected such that one unit of outline length in FIG. 32 is scanned for each unit of time.

If we consider $\theta$ to be 45°, by way of example, the $y(t) \sin 45°$ and $y(t) \cos 45°$ signals provided by resolvers 117 and 121, respectively, take the form illustrated as curve 131 in FIG. 33. Likewise the $x(t) \sin 45°$ and $x(t) \cos 45°$ signals provided by resolvers 115 and 119, respectively, take the form illustrated as curve 133 in FIG. 34. To find $y(t)$ at $\theta = 45°$ we merely subtract curve 133 from curve 131. The result is the curve illustrated in FIG. 35. Likewise, to find $x(t)$ at $\theta = 45°$, we add curves 131 and 133 and end up with the curve of FIG. 36. Translating the curves of FIGS. 35 and 36 back to the x–y plane produces the plot of FIG. 37. Note that the L-shaped piece has been rotated by 45° and has A, B, C, D, E, F and G intersection points with $(x,y)$ co-ordinates of (2.1,–0.7), (3.5,–2.1), (4.2,–1.4), (3.5,–0.7), (4.9,0.7), (4.2,1.4), and (2.1,–0.7), respectively.

A similar analysis may be made for $\theta = 90°$. Here $y(t) \cos \theta$ and $x(t) \cos \theta$ are zero; $y(t) \sin \theta = y(t)$; and $x(t) \sin \theta = x(t)$. Thus, $y(t)$ at 90° is illustrated in FIG. 37a and is simply curve 127 multiplied by −1. $x(t)$ at $\theta = 90°$ is illustrated in FIG. 38 and is identical to curve 129. Transforming the curves of FIGS. 37a and 38 back to the x–y plane produces the plot of FIG. 39. Note that the L-shpaed piece has been rotated by 90° and has intersection points A, B, C, D, E, F and G with $(x,y)$ co-ordinates (1,–2), (1,–4), (2,–4), (2,–3), (4,–3), (4,–2), and (1,–2) respectively.

It should be noted that where polar co-ordinates are employed instead of rectangular co-ordinates, rotational transformation is accomplished with much simpler structure than that of FIG. 31. Specifically, since polar co-ordinates are represented by an angle and a radius, simple incrementation of the angle effects desired rotation.

Horizontal translation of the piecepart, as performed by unit 103 in FIG. 30, may be accomplished by the circuit of FIG. 40. The $y(t)$ ROTATED and $x(t)$ ROTATED signals provided in FIG. 31 are applied to respective variable delay elements 135, 137 in FIG. 40. Elements 135 and 137 are identical and delay their respective input signals identically. The delay in each is controlled by the output signal from a staircase wave generator 139 which is synchronized by time synchronization circuit 26. Synchronization is required to reset the staircase wave generator for each rotational step of the piecepart; to this extent, generator 139 must be reset for each step of the angle signal staircase generator 102 of FIG. 30. Between re-setting times of generator 139, it increments the delay period of delay elements 135 and 137 in a plurality of steps.

The output signal from delay element 137 is applied to a signal summing circuit 141 which receives a second input signal from a box car detector comprising a diode 143 and capacitor 145. Diode 143 is poled to pass positive signal from a summing circuit 147. A detector reset circuit is connected to discharge capacitor 145 to ground each time the reset circuit is triggered. Such triggering is effected by the master time synchronization circuit 26 and occurs immediately prior to each step incrementation at staircase wave generator 139.

The output signal from summing circuit 141 is subtracted from the $x(t)$ ROTATED input signal at gated adder circuit 151. The latter provides an output signal of amplitude proportional to the difference in amplitudes of its input signals, such output signal only being provided when circuit 151 is triggered. Triggering pulses for this purpose are provided by analog coincidence gate 153 which receives as input signals $y(t)$ ROTATED and the output signal from delay element 135. Gate 153 may comprise a differential amplifier feeding a Schmitt trigger to provide a pulse whenever the two input signal amplitudes are equal. Adder 151, therefore, is triggered whenever the amplitude of $y(t)$ ROTATED and the amplitude of the delayed version of $y(t)$ ROTATED are equal.

The output signal from gated adder 151 is applied to summing circuit 147 where its amplitude is added to that of a WEB signal. The latter is adjustable, by means of variable resistor 155, for example, to provide an indication of the minimum web permitted for the sheet metal stock being employed.

The WEB signal also serves as a reference signal at gated threshold detector circuit 157. The latter also receives the box car detector output signal from the junction of diode 143 and capacitor 145, and is gated on by a pulse from the master time synchronization circuit immediately preceding each step incrementation at staircase wave generator 139. If the box car detector signal level is the WEB signal by a predetermined amount, detector 157, when gated, provides a gating pulse to transmission gate 159 which in turn passes the then current output signal from staircase wave generator 139, as a "jump" signal, to following circuitry. The amplitude of this signal represents the shift between the orignal and translated outlines.

In addition the signal which gates on transmission gate 159 serves to gate on multiplier 109 (FIG. 30) in the manner described below.

In operation, the dwell time of staircase wave generator 139 at each amplitude level is at least long enough to permit a complete outline scan of the piecepart represented by signals $x(t)$ ROTATED and $y(t)$ ROTATED. During such scan, whenever $y(t)$ ROTATED and its delayed version have the same amplitude, gated adder 151 is triggered to charge capacitor 145 to an amplitude substantially corresponding to the amplitude difference between $x(t)$ ROTATED and its delayed version. This corresponds to measuring the distance along the x-axis between points of the same y value on the original and translated outlines. If the difference signal provided by gated adder 151 is positive, the outline has not been sufficiently translated. The difference is negative when all points on the translated outline lie to the right (along the x-axis) of all points on the original outline. To this difference is added the constant positive WEB signal, to provide an overall signal at the box car detector input which can go to zero only when the original and translated outlines are separated by at least the minimum web distance throughout a complete outline scan interval. If the outlines are separated by at least the minimum web distance throughout an entire scan interval, triggering of detector 157 at the end of that interval opens gate 159 and passes the minimum jump signal (for the current rotational position) to the following circuitry. If the box car detector signal does not remain at a low enough level, throughout an entire outline scan, to trigger detector 157, the delays at elements 135, 137 are incremented and another outline scan is initiated. The cycle repeats until the desired separation is achieved.

The box car detector serves two functions. First, it serves as a pulse stretcher, holding the amplitude of pulses applied thereto until reset at the onset of the next outline scan. Second, it serves as a maximum amplitude seeking device, maintaining (between outline scans) its current voltage unless a higher voltage is applied thereto. Thus, as various points are examined during an outline scan, the box car detector tends to register a level corresponding to the point of greatest outline overlap. This is important, because for some piecepart configurations, it is conceivable that not all portions of the outline will overlap.

The details of units 105 and 107 of FIG. 30 are illustrated in detail in FIG. 41. The outline scan unit 105 includes a maximum detector, comprising diode and capacitor 163, and a minimum detector, comprising diode 165 and capacitor 167. Each detector receives the $y(t)$ ROTATED signal. In addition, capacitors 163 and 167 are charged at the beginning of each outline scan to the initial $y(t)$ ROTATED level via momentary gate 169. More specifically, at the start of each outline scan, time synchronization circuit 26 pulses momentary gate 169 to in turn charge capacitors 163, 167 to the intial amplitude of $y(t)$ ROTATED. If the amplitude of $y(t)$ ROTATED increases thereafter, the charge on capacitor 163 follows accordingly; if it decreases, the charge on capacitor 167 follows accordingly. At the end of the outline scan interval, capacitor 163 has stored therein a voltage (y max) representing the maximum amplitude attained by $y(t)$ ROTATED during that scan interval. Likewise, capacitor 167 stores the minimum amplitude (y min) attained by $y(t)$ ROTATED during that scan interval. At this time (i.e. — at the end of the scan interval), time synchronization circuit 26 opens two transmission gates 171, 173 to pass the y max and y min signals, respectively, to a summing circuit 175 in unit 107. Summing circuit 175 provides an output signal of amplitude equal to the difference between the amplitude of y max and y min; this output signal is the height signal, representative of the total vertical (y-axis) displacement of the outline for its position during that outline scan.

The height and jump signals are applied to multiplier circuit 109 of FIG. 30. The latter is gated on only by the output signal from gated threshold detector 157 of FIG. 40 so that actual multiplication takes place only when the minimum horizontal jump has been determined for the current rotational position of the piecepart. When gated on, multplier 109 provides a signal amplitude representative of the minimum sheet stock area which must be dedicated to a single piecepart for the current rotational position of the piecepart. Multiplier 109 includes a temporary storage circuit which maintains the area signal present at the multiplier output terminal in the interval between gating pulses applied to the multiplier. Multiplier circuits and temporary storage circuits of the type described are well-known in the prior art.

Figure 42:
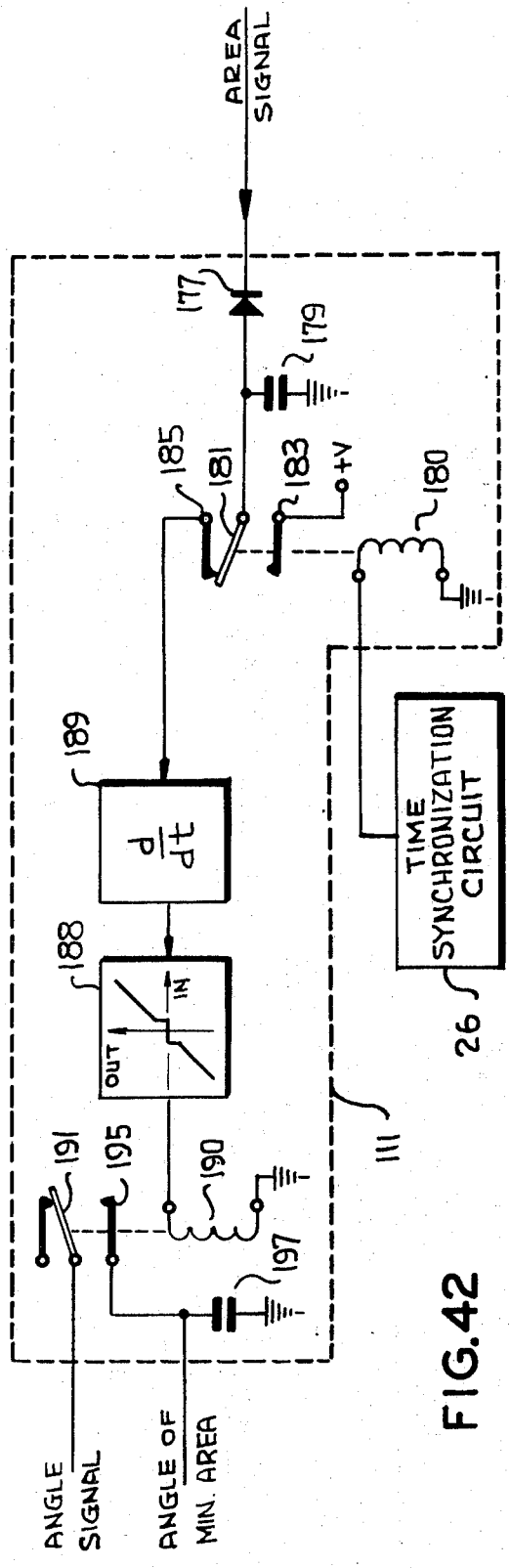

The area signal provided by multiplier 109 is applied to minimum area detector circuit 111 of FIG. 30, illustrated in greater detail in FIG. 42. This circuit determines the minimum amplitude of the area signal for all rotational positions of the piecepart. More specifically, for each rotational position of the piecepart, the previously described circuitry determines the sheet stock area required for dedication to a single piecepart. Circuit 111 then determines which rotational position required the minimum value of sheet stock area.

In FIG. 42, the area signal is applied to the cathode of a diode 177 whose anode is connected to storage capacitor 179. The diode-capacitor combination serve as a minimum amplitude detector for the area signal. The junction between diode 177 and capacitor 179 is connected to the arm 181 of a set of contacts for relay 180 whose normally open contact is connected to a source of positive voltage +V. V is selected to be greater than the maximum possible amplitude of the area signal. Normally closed relay contact 185 is connected to the signal input terminal of a differentiator circuit 189. The latter in turn feeds a threshold detector 188 of the same type as detectors 73 and 85 in FIG. 15. The output signal from threshold detector 188 drives the coil of a relay 190 having a movable arm which receives the angle signal from staircase generator 102 in FIG. 30. The normally open contact 195 of relay 190 is returned to ground through storage capacitor 197. The voltage across capacitor 197, as explained below, comprises the "angle of minimum area" signal applied to override switch 113 in FIG. 30.

The coil of relay 180 is actuated by time synchronization circuit 26 as each rotational step of the piecepart is initiated (i.e. — at the beginning of each step of staircase wave generator 102). At this time capacitor 179 is charged to +V, a voltage higher than the maximum voltage of the area signal. Relay 180 is then de-energized and the minimum amplitude detector is connected to differentiator 189. The area signal from the multiplier is then applied to the maximum detector.

Since the area signal voltage is less than V, capacitor 179 discharges until it equals the area signal voltage. As the area signal level decreases, the voltages across capacitor 179 follows. The derivative of this decreasing voltage is not zero and therefor an output signal is provided by differentiator circuit 189. Threshold detector 188 removes low amplitude noise from this signal and operates non-polar relay 190. When relay 190 is actuated the angle signal charges capacitor 197. The angle signal, as described above, has an increasing staircase waveform which at each step represents a corresponding angle of rotation of the piecepart. When the area signal voltage ceases to decrease, having reached a minimum value, its derivative becomes zero. This interrupts the output signal from differentiator 189 and de-energizes relay 190. The storage capacitor 197 has stored thereacross at this time a voltage representing the angle at which minimum area was detected.

After the piecepart has been rotated through a full 360°, the angle of minimum area is passed through override switch 113 to set circuit 101 to the angle of minimum area. The output signals provided by the circuitry of FIG. 30 at that point are those corresponding to orientation of the piece-part for minimum sheet stock area.

Figure 43:
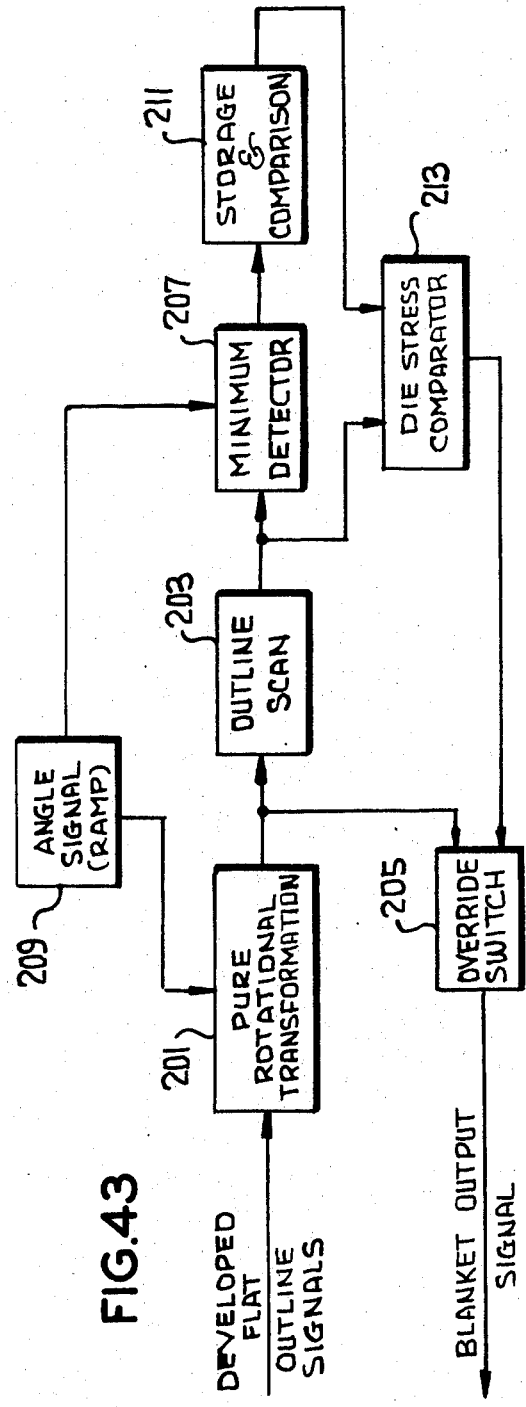
FIG. 43 is a block diagram illustrating the blanket transformation process of FIG. 3.

The next operation indicated in FIG. 3 is performed by unit 37 and comprises a blanket transformation for subdividing prong punchings and openings. This transformation can be better understood by referring to FIGS. 43 through 48. FIG. 43 is a block diagram indicating the processes which occur during the operation of the blanket transformation.

The blanket transformation is a transformation which enwraps the original flat developed outline in a new outline containing some convex portions of the original outline and possibly some additional straight segments or curved segments of convex form which produce an overall outline of generally convex shape. The name Blanket Transformation has been arbitrarily chosen to represent this new concept by analogy to the shape of a blanket wrapped about a particular object. The purpose of the blanket transformation is to indicate those portions, within the outline which will be eventually blanked to sever the piecepart from the original sheet metal stock, which require a deep or long prong in the die structure. Such a prong would generally be subject to unusually high stresses during punching or blanking operations, and therefore is liable to break. As such, the blanket transformation represents a process which is often called Pattern Recognition in scientific terminology. However, it must be emphasized that the blanket transformation is not purely geometrical in character, but represents the result of both pattern recognition and engineering-based stress relationships. This will become more clear through examination of the figures.

FIG. 43 illustrates the developed flat outline signals applied to the circuit. Unit 201 transforms these signals through a pure rotation in precisely the same way as does unit 101 of FIG. 20. The resultant signals, after rotation, pass on both to unit 203, an outline scan unit of exactly the same nature as unit 105 of FIG. 30, and an override switch 205 of the same nature as override switch 113 of FIG. 30. The minimum detector unit 207 operates the same way as unit 111 of FIG. 30. It utilizes the outline scan signal from unit 203 and the continuous angle signal from unit 209, to produce the angle corresponding to the extremal or lowest point on the outline. This is fed to storage and comparison unit 211. At certain angles of orientation there will be more than one minimum point on the outline. Unit 211, through the action of storing a minimum and comparing it to any later minimum which may be found during the action of the outline scan, detects the presence of two minimum points at the same level. When this occurs the signals representing the two, or more, angles of lowest point on the outline are sent to die stress comparator unit 213 along with the signals representing the outline itself from unit 203.

When the continuous angle signal from ramp generator 209 is of a value such that there is a double minimum in the outline at that orientation, a portion of the blanket line can be formed by substitution of a straight horizontal line for a portion of the original outline. This straight horizontal line is represented in the signals which flow in the units of FIG. 43 by a constant level signal. It is at this point that engineering considerations enter the picture together with the pattern recognition facilities of the system. The mere existance of a projection which deviates from a completely convex blanket is not, in itself, an indication that it is physically necessary to remove this portion of the metal in a separate gutting step. It must first be determined what stress will be exerted on the die if that portion of the outline is blanked as part of the overall outline. This is determined through the action of the die stress comparator, unit 213. Several methods are suitable for the die stress comparator operation. There are many methods for evaluating the bending stress produced along the blanket axis by the shearing force acting along that portion of the outline over which the part outline deviates from the blanket axis. Each of these methods is suitable for implementation by machinery. The most elaborate method would involve evaluation of the bending moment produced about the blanket axis by each element of the outline having a force exerted on it, which force corresponds to the shearing force involved in the blanking of the outline. A simplified method, which is suitable in most practical situations, is to merely examine the outline and determine if any portion of it lies further from the blanket axis than some suitably chosen threshold level. Since the shear force is approximately uniform along every portion of the outline, and the bending moment contributed by this shear force is proportional to the perpendicular distance of that point from the blanket axis, it is only those points beyond the threshold distance which produce excessive bending stresses in the die. Because of its ease of implementation, this technique is a preferred method of constructing die stress comparator 213.

By examining FIGS. 44 thorough 48, the action of the blanket transformation process, and particularly the die stress comparator can be understood more clearly. Taking a piecepart outline which is roughly similar to the piecepart illustrated in FIG. 1, let us examine its orientation at several different angles of rotation. In FIG. 44, at zero degrees rotation, there is a double minimum at points A and B. This would be detected by the mechanism of FIG. 43 and, if so determined by die stress comparator 213, a horizontal line, indicated by the dashed line of FIG. 44, would be inserted into the output signals in place of a portion of the original outline between points A and B. This straight line would be inserted by the action of the die stress comparator 213 and override switch 205 as described in detail below. In FIG. 47 note that the signal representing the portion of the original outline which is identified as a prong in FIG. 44 between points A and B, indeed rises above a preselected threshold level. Therefore die stress comparator 213 sends a signal to override switch 205 to override a portion of the original outline and provide a constant signal level between points A and B.

In FIG. 45 the same piecepart outline has been rotated 90°. At this angle of orientation the outline has but one minimum point. Therefore, there will be no output signal from storage and comparison unit 211. The system of FIG. 43 continues to produce rotational transformations of the signals representing the outline until another situation occurs wherein a double or other multiple minimum exists. Such a situation is shown in FIG. 46. In this case, however, when the portion of the outline lying between points C and D is processed by the die stress comparator, the signal representing the portion of the original outline does not rise above the threshold level, as indicated in FIG. 48. Therefore, die stress comparator 213 does not activate override switch 205, and the blanket output signal for that portion of the outline is identical to the original outline segment. Thus, even though that portion of the original outline is not strictly convex, it is not necessary to remove it from the outline from an engineering stress point of view. The final result of the overall blanket transformation process is a signal output from the system of FIG. 43 which corresponds to the overall shape illustrated in FIGS. 44 or 45 in which the dashed line is substituted for the prong in the original outline.

In summary then unit 211, the storage and comparison circuit, consists of a series of two storage devices which can store the angles corresponding to two repeating minimum points on the outline of a part as described by the y co-ordinate signal only. Minimum detector 207 is used to examine the y co-ordinate signal and transfer the angle signal corresponding to a minimum to storage and comparison unit 211. The latter, upon receiving this angle signal and storing it (e.g. in a switched storage capacitor circuit as in the minimum detector itself) then switches over to a second internal storage device to store the angle signal corresponding to the second minimum point, when it occurs.

During the next repetitive rotation, die stress comparator 213, illustrated in detail in FIG. 49, compares the y co-ordinate signal between the two minimum points (e.g. A and B in FIG. 44) with the constant y-minimum signal from the outline scan circuit 203, to find if the distance between these signals exceeds the pre-set threshold. This subtraction is performed at summing circuit 215. When it does exceed the threshold (pre-set for the particular stress, metal, and thickness to be used) the output of the threshold device operates the override switch 205 and by-passes the original part y co-ordinate signal, replacing it with the y-minimum constant signal during that interval to form the new blanket line. At the end of this new blanket line segment, the override switch returns to its original state of passing the outline signal, since the y-minimum difference signal drops below the threshold, or the second minimum angle is reached, cutting off the signal at the gating circuit, or both.

The blanket transformation is also to be applied to the outlines of all interior holes existing within the piece-part outline and which are not a portion of the outline to be finally blanked. Such interior holes may be of such complex shape that they would not permit punching in one operation, just as some exterior outlines do not permit punching in one operation. This can be best illustrated with reference to FIGS. 50 through 55. FIG. 50 illustrates a square piecepart 221 with a hole 223 having an internal prong 225 of its own. FIG. 51 illustrates the results of applying the blanket transformation to the outline of hole 223. It is clear that the prong 225 is sufficiently long that it could not be safely punched in one operation without danger of breaking off in the die. In FIG. 52 an additional line 226 has been added to the outline of the hole, from the highest point A on prong 225 to the nearest point B on the outline. This line divides the original hole into two portions, which are shown physically separated for clarity in FIG. 53. A further application of the blanket transformation to either of the two subholes shown in FIG. 53 would demonstrate that although they are not completely convex in shape, the prongs which exist in these subdivided holes are sufficiently small that no danger results from piercing each of these sub-openings as an individual operation. When the blanket transformation is applied to either of these subholes, the resultant signal corresponds precisely to the original outline of the subhole, indicating that no further subdivision is necessary.

FIG. 54 illustrates a piecepart 231 having a more complicated spiral shaped opening 233. The spiral opening in general is one of the most difficult shapes to pierce without damage to the die, due to the requirement for a long unsupported prong which curls internally. The first application of the blanket transformation to this spiral opening leads to an outline including the straight dashed segment between points A and B of FIG. 54. The highest point on the curved prong, which originates from A and B and curls around the inside of the opening, is at point C and a projection of a dividing line at that point across the opening subdivides the latter into two portions. The upper portion between points A and C can be pierced in a single operation but the lower portion is treated again by a second blanket transformation and a second subdivision. This leads to another division of the overall opening, followed by another application of the blanket transformation, and so forth. This process is repeated until all subdivisions of the original hole opening, when treated with the blanket transformation, yield an identical outline. This indicates that the resultant subdivision of the original opening consists of a minimum number of parts, each of which can be pierced in a single operation. The result of this repeated application of the blanket transformation and subdivision is shown in FIG. 55. The original spiral opening 233 has been divided into five arc-shaped openings 235, 237, 239, 241, 243. They have been separated for clarity although their ends actually touch or overlap. It is obviously not possible to pierce all five of these at a single stage in the die making process, but these individual holes will be separated into different stages by the sorting transformation, yet to be applied.

The sorting transformation, performed by unit 39 of FIG. 3, serves to separate the individual operations needed to manufacture the part among the various stages of the die. This is accomplished by separating the various signals which relate to individual holes or punching operations, according to their distance from each other, or some similar criterion relating to the minimum amount of die metal between adjacent openings. They are sorted into groups, each group containing signals which represent holes which are adequately far apart to permit piercing within a common stage of the material. Operations for sorting data of this nature are well known in the art and require no elaboration at this point, see "Computer Sorting" by I. Flores, Prentice Hall Company, 1969, and "Progressive Dies", by Daniel B. Dallas, McGraw Hill Book Company, 1962, Chapter 7.

At this point, the orientation and arrangement of piercing and bending operations, if drawn in a visual form, would appear as a usable ribbon layout. This ribbon layout, in itself, is very useful to the diemaker. It is ordinarily sufficient in itself for an experienced diemaker to build the entire die. However, it is a great convenience for the diemaker to have the complete die design process carried out by the machine rather than being required to do any hand operations of any kind. Therefore, unit 41 of FIG. 3 is provided to do the necessary format conversions for plotter control, produce necessary or desirable additional output such as punched tape, direct machine control, and additional plotting output giving such information as required stock for a bill of material, standard fasteners of various kinds which may be required, and the like.

The signals contemplated as usable in an implementation of this invention include, but are not limited to, electrical currents or voltages, mechanical or hydraulic pressure or flow or velocity, or digital versions of any of these in which distinct signal levels are assigned to correspond to digital representations of the numerical values of said signals in a binary, decimal, or other radix system of numbering.

In the various transformations described herein, it is to be understood that the examples given of such relationships as the stress-strain relationship for a metal will vary from one metal to another, and that future measurements taken with instruments of greater precision may supercede presently accepted relationships. Similarly certain parameters used in the transformations may be altered in various implementations due to future availability of more precise data, without departing from the scope and spirit of the invention.

Note that in all circuit and/or block diagrams used for explanation of the action of the various parts of the system, all circuit interconnections are shown in their simplest possible form, using circuit elements such as capacitors, diodes, etc. for the sake of simplicity and clarity. It is well known to those engineers versed in the art that such systems would, in general, include such devices as buffer amplifiers between various portions of the circuitry to reduce circuit loading and thus improve accuracy, although these have been omitted from the diagrams for clarity. Furthermore the same functions can be performed by other equivalent devices, especially when the signals are in sampled and/or digitized (serial or parallel) form.

It is to be understood that the means and method disclosed herein are applicable to many related forming processes including, but not limited to, diecasting, molding of metals and nonmetals (such as glass and polymer plastics), and extrusion.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a method for automatically designing by computing apparatus a progressive die for use in manufacturing a specified piecepart of predetermined material, the steps of:

generating electrical co-ordinate signals representative of said piecepart;

transforming said co-ordinate signals to transformed co-ordinate signals representing said piecepart flattened into a sheet of said predetermined material but with a component to accommodate spring back effects of said material;

modifying said transformed co-ordinate signals to modified transformed co-ordinate signals representing said piecepart entirely flattened to compensate for said component; and storing said co-ordinate signals, said transformed co-ordinate signals, and said modified transformed co-ordinate signals.

2. The method according to claim 1 further comprising the step of sorting the stored signals in an order corresponding to progressive die operations.

3. The method according to claim 1 wherein the step of transforming includes removing bends from the piecepart represented by said co-ordinate signals less said component.

4. The method according to claim 3 where said component is an overbend component and wherein the step of modifying comprises removing said overbend component in the piecepart represented by said transformed co-ordinate signals to compensate for spring back characteristic of said predetermined material.

5. The method according to claim 1 further comprising the step of processing said modified transformed co-ordinate signals to determine which orientation of successive outlines of said flattened piecepart on a sheet of said material minimizes waste of said material.

6. The method according to claim 5 wherein said step of processing comprises:

rotating said flattened piecepart, in the form of said modified transformed co-ordinate signals, in plural successive angular increments where at each angular increment the following steps (a) – (d) occur:

a. translating said rotated flattened piecepart, in the form of said rotated, modified transformed co-ordinate signals, a first distance along a first co-ordinate axis to a location at which the outlines of the rotated flattened piecepart and the translated rotated flattened piecepart are separated by a pre-established minimal spacing;

b. measuring said first distance along said first co-ordinate axis;

c. measuring a second distance along a second co-ordinate axis perpendicular to said first co-ordinate axis, at least between the maximum and minimum points of the rotated flattened piecepart;

d. multiplying said first distance by said second distance, in the form of signals, to provide an area signal having an amplitude representing the product of said distances;

detecting the minimum amplitude of said area signal; and storing a signal representing the incremental rotation step of said flattened piecepart at which the minimum amplitude of said area signal was detected.

7. The method according to claim 6 further comprising the step of detecting portions of the outline of said piecepart which are to be punched at a different stage of said progressive die than the remainder of said outline, the last-mentioned step comprising the steps of:

generating blanket co-ordinate signals representing a closed completely convex line coinciding with convex portions of the outline of said flattened piecepart;

measuring the displacement betwen said closed convex line and segments of said outline of said flattened piecepart lying interiorly of said closed convex line;

comparing the bending stresses induced in a die section of a die having the shape of said outline with a pre-established maximum safe stress; and designating those segments of said outline extending interiorly of said closed convex line by more than a pre-established displacement corresponding to said pre-established maximum safe stress as portions of said outline to be separately punched.

8. The method according to claim 7 further comprising the step of determining whether holes in said piecepart should be punched in one stage of said progressive die, said last-mentioned step comprising:

generating further blanket co-ordinate signals for each hole representing a further closed completely convex line coinciding with convex portions of the outline of said hole and including all other portions of the outline of said hole interiorly of said convex line;

measuring the displacement between said further closed convex line and segments of said outline of said hole lying interiorly of said further closed convex line;

comparing the bending stresses induced in a die section of a die having the shape of said outline with a pre-established maximum safe stress; and designating those segments of said outline of said hole extending interiorly of said further convex line by more than a threshold value corresponding to said pre-established maximum safe stress as portions of said hole to be separately punched.

9. The method according to claim 1 further comprising the step of orienting said flattened piecepart, in the form of said modified transformed co-ordinate signals, in an angular position wherein successive outlines of the oriented flattened piecepart on a sheet of said material consume a minimum of area of said material, said step of orienting comprising:

rotating said flattened piecepart in the form of said modified transformed co-ordinate signals, through 360° in angular increments;

wherein at each of said angular increments the following steps (a) – (d) occur:

a. translating the outline of said flattened piecepart, in the form of said modified transformed co-ordinate signals, a first distance along a first co-ordinate axis until said outline and the translated outline are separated by a pre-established minimum spacing;

b. measuring said first distance;

c. measuring at least the length of said rotated piecepart along a second co-ordinate axis perpendicular to said first co-ordinate axis;

d. multiplying said first distance by said length to provide an area signal of amplitude proportional to the product of said first distance and said length;

detecting the minimum amplitude of said area signal; and storing a signal representing the angle of the incremental step at which said minimum amplitude is detected.

10. The method of designing a progressive die by computing apparatus, said method comprising:

generating electrical co-ordinate signals representing an article of specified material;

transforming said co-ordinate signals to alter the configuration of said article in a predetermined manner; and modifying said transformed signals to compensate for deformation of said material during alterations of the configuration of said article.

11. The method according to claim 10 wherein the step of transforming comprises partially removing curves from said articles as represented by said co-ordinate signals.

12. The method according to claim 10 wherein the step of modifying comprises removing from said transformed. signal a component corresponding to the over-bending imparted to said article, as represented by said transformed co-ordinate signals, to compensate for spring back characteristics of said material whereby said modified, transformed signal represents said article completely flattened.

13. The method of automatically laying out by computing apparatus successive versions of a planar outline of an article on a sheet of material with minimum waste of said material, said method comprising the steps of:

generating electrical co-ordinate signals representing said planar outline;

rotating said outline, in the form of said co-ordinate signals, through 360° in angular increments:

wherein at each angular increment the following steps (a) – (d) occur:

a. translating said outline along a first co-ordinate axis a sufficient distance to separate said outline by a pre-established minimum spacing;

b. measuring said sufficient distance;

c. measuring the length of at least the rotated outline along a co-ordinate axis perpendicular to said first co-ordinate axis;

d. multiplying said sufficient distance by said length and providing:

detecting the minimum value of the product of said sufficient distance and said length during rotation of said outline; and providing an indication of the angular step at which said minimum value occurred.

14. The method of determining by computing apparatus which segments of a planar outline of a piecepart should be punched at a different stage of a progressive die than the remainder of said outline, said method comprising the steps of:

generating electrical coordinate signals representing a closed completely convex line coinciding with convex portions of said outline and including all other portions of said outline interiorly thereof;

comparing the bending stresses induced in a die section of a die having the shape of said outline with a pre-established maximum safe stress; and designating segments of said outline displaced from said closed convex line by more than a threshold displacement corresponding to said pre-established maximum safe stress as segments to be punched at different stages of said progressive die than said remainder of said outline.

15. Apparatus for use in automatically designing a progressive die to be used in manufacturing a specified piecepart of predetermined material, said apparatus comprising:

means for generating coordinate signals representative of said piecepart;

means for transforming said coordinate signals into transformed coordinate signals representing said piecepart flattened into a sheet of said predetermined material but with a component accommodate spring back effects of said material;

means for modifying said transformed coordinate signals to modified transformed co-ordinate signals representing said piecepart entirely flattened to compensate for said component; and means for storing said coordinate signals, said transformed coordinate signals, and said modified transformed co-ordinate signals.

16. The combination according to claim 15 further comprising means for sorting the stored signals in an order corresponding to progressive die operations.

17. The combination according to claim 15 wherein said means for transforming includes means for removing bends from the piecepart represented by said coordinate signals less said component.

18. The combination according to claim 17 where said component is an overbend component and wherein said means for modifying comprises means for removing said overbend component in the piecepart represented by said transformed coordinate signals to compensate for spring back characteristics of said predetermined material.

19. The combination according to claim 15 further comprising means for processing said modified transformed coordinate signals to determine which orientation of successive outlines of said flattened piecepart on a sheet of said material minimizes waste of said material.

20. The combination according to claim 19 wherein said means for processing comprises:

means for rotating said flattened piecepart, in the form of said modified transformed coordinate signals, in plural successive incremental steps;

means for translating, during each of said incremental rotational steps, said rotated flattened piecepart, in the form of said modified transformed co-ordinate signals, a first distance along a first coordinate axis to a location at which the outlines of the rotated flattened piecepart and the translated rotated flattened piecepart are separated by a pre-established minimal spacing;

means for measuring, during each of said incremental rotational steps, said first distance along said first coordinate axis;

means measuring, during each of said incremental rotational steps, a second distance along a second coordinate axis perpendicular to said first coordinate axis, at least between the maximum and minimum points of the rotated flattened piecepart;

means for multiplying, during each of said incremental rotational steps, said first distance by said second distance, in the form of signals, to provide an area signal having an amplitude representing the produce of said distances;

means for detecting the minimum amplitude of said area signal; and means for storing a signal representing the incremental rotation step of said flattened piecepart at which the minimum amplitude of said area signal was detected.

21. The combination according to claim 20 further comprising means for detecting portions of the outline of said piecepart which are to be punched at a different stage of said progressive die than the remainder of said outline, said means for detecting comprising:

means for generating blanket coordinate signals representing a closed completely convex line coinciding with convex portions of the outline of said flattened piecepart;

means for measuring the displacement between said closed convex line and segments of said outline of said flattened piecepart lying interiorly of said closed convex line;

means for comparting said displacement with a pre-established displacement; and means for designating those segments of said outline extending interiorly of said closed convex line by more than said pre-established displacement as portions of said outline to be separately punched.

22. The combination according to claim 21 further comprising means for determining whether holes in said piecepart should be punched in a common stage of said progressive die, said last-mentioned means comprising:

means for generating further blanket coordinate signals for each hole representing a further closed completely convex line coinciding with convex portions of the outline of said hole and including all other portions of the outline of said hole interiorly of said convex line;

means for measuring the displacement between said further closed convex line and segments of said outline of said hole lying interiorly of said further closed convex line, means for comparing said last-mentioned displacement with a threshold level; and means for designating those segments of said outline of said hole extending interiorly of said further convex line by more than said threshold value as portions of said hole to be. separately.

23. In combination:

means generating coordinate signals representing an article of specified material;

means for transforming said coordinate signals to alter the configuration of said article in a predetermined manner; and means for modifying said transformed signals to compensate for deformation of said material during alteration of the configuration of said article.

24. The combination according to claim 23 wherein said means for transforming comprises means for partially removing curves from said article as represented by said co-ordinate signals.

25. The combination according to claim 23 wherein said means for modifying comprises means for removing from said transformed signal a component corresponding to the overbending imparted to said article, as represented by said transformed co-ordinate signals, to compensate for spring back charcteristics of said material whereby said modified, transformed signal represents said article completely flattened.

26. Apparatus for determining which segments of a planar outline of a piecepart should be punched at a different stage of a progressive die than the remainder of said outline, said apparatus comprising:

means for generating co-ordinate signals representing a closed completely convex line coinciding with convex portions of said outline and including all other portions of said outline interiorly thereof;

means for comparing the displacement between said closed convex line and portions of said outline interiorly thereof with a threshold displacement; and means for designating segments of said outline displaced from said closed convex line by more than said threshold displacement as segments to be punched at different stages of said progressive die than said remainder of said outline.

27. A method for automatically designing by computing apparatus a progressive die for use in manufacturing a specified piecepart of predetermined material, said piecepart having a plurality of features which characterize said piecepart comprising the steps of:
  a. generating a plurality of electrical signals where each signal defines the location and dimensions of one of said features;
  b. storing said electrical signals;
  c. sorting the stored signals in an order corresponding with the series of operations to be performed by said progressive die, said sorting including the steps of separating said electrical signals in groups where each group includes operations which can be performed at a common stage of the progressive die.

28. A method as in claim 27 where the signals included in each said group represent holes which are adequately far apart to permit piercing of said holes at a common stage of said progressive die.

29. A method as in claim 27 where at least a portion of said piecepart is non-flat, said method including the steps of processing the electrical signals corresponding to those features related to the non-flat portions to obtain processed signals representing those features after said non-flat portion has been flattened taking into account any deformation of said material necessary to form said non-flat portion;

storing said processed signals; and where during said sorting step, both said stored electrical signals and said stored processed signals are sorted into said order corresponding to the series of operations to be performed by said progressive die.

30. A method for automatically designing by computing apparatus a progressive die for use in manufacturing a specified piecepart of predetermined material, said piecepart having a plurality of features which characterize said piecepart where at least a portion of said piecepart is non-flat comprising the steps of:
  a. generating a plurality of electrical signals where each signal defines the location and dimensions of one of said features;
  b. processing the electrical signals corresponding to those features related to the non-flat portions to obtain processed signals representing those features after said non-flat portion has been flattened taking into account any deformation of said material necessary to form said non-flat portion; and
  c. storing said electrical signals.

31. A method as in claim 30 where said processing step includes the steps of:
  a. generating from said plurality of electrical signals further electrical signals corresponding to the non-flat portions of said piecepart;
  b. generating from said further electrical signals compensation signals corresponding to the additional deformation which must be imparted to said material in order to form said non-flat portion; and
  c. combining said further electrical and compensation signals to obtain said processed signals.

32. A method as in claim 31 where said combining step includes the steps of
  a. subtracting said compensation signals from said further electrical signals to obtain a signal representative of the non-flat portion of said piecepart less said additional deformation;
  b. subtracting said last-mentioned signal from said plurality of electrical signals to form transformed signals representative of said piecepart completely flattened but for said additional deformation; and
  c. modifying said transformed signals to modified, transformed signals representative of said piecepart entirely flattened.

33. A method as in claim 32 where said modifying step includes the steps of:
  a. generating from said transformed signals corresponding to said compensation signals; and
  b. subtracting from said transformed signals said compensation signals to obtain said modified, transformed signals.

34. In a method for automatically designing by computing apparatus a progressive die for use in manufacturing a specified piecepart of predetermined material, the steps of:

generating electrical coordinate signals representative of said piecepart;

storing said coordinate signals; and sorting the stored signals in an order corresponding to progressive die operations.

35. In a method for automatically designing by computing apparatus a progressive die for use in manufacturing a specified piecepart of predetermined material, the steps of:

generating electrical co-ordinate signals representative of said piecepart; and processing said co-ordinate signals to determine which segments of a planar outline of said piecepart should be punched at a different stage of said progressive die.

36. In a method for automatically designing by computing apparatus a progressive die for use in manufacturing a specified piecepart of predetermined material, the steps of:

generating electrical co-ordinate signals representative of said piecepart; and processing said co-ordinate signals to determine whether holes in said piecepart should be punched in a common stage of said progressive die.

37. The method according to claim 1 wherein the step of transforming includes removing draws from the piecepart represented by said co-ordinate signals less said component.

38. The method according to claim 1 where said co-ordinate signals, said transformed signals, and said modified transformed signals are electrical.

39. The method according to claim 10 where the alteration performed in said transforming step results in the flattening of said article into a sheet of said specified material.

40. The combination according to claim 23 where said transforming means alters the configuration of said article by flattening it into a sheet of predetermined material.

41. A method as in claim 27 where at least a portion of said piecepart is non-flat, said method including the steps of processing the electrical signals corresponding to those features related to the non-flat portions to obtain processed signals representing those features after said non-flat portion has been flattened;

storing said processed signals; and where during said sorting step, both said stored electrical signals and said stored processed signals are sorted into said order corresponding to the series of operations to be performed by said progressive die.

* * * * *